(12) United States Patent
Takahashi et al.

(10) Patent No.: US 8,427,626 B2
(45) Date of Patent: Apr. 23, 2013

(54) LENS ARRAY ELEMENT AND IMAGE DISPLAY DEVICE

(75) Inventors: Kenichi Takahashi, Kanagawa (JP); Sho Sakamoto, Tokyo (JP); Yoshihisa Sato, Saitama (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 12/926,808

(22) Filed: Dec. 10, 2010

(65) Prior Publication Data

US 2011/0181827 A1    Jul. 28, 2011

(30) Foreign Application Priority Data

Jan. 27, 2010   (JP) .................................. 2010-015739
Jun. 30, 2010   (JP) .................................. 2010-149206

(51) Int. Cl.
*G02F 1/13*     (2006.01)
*G02F 1/1335*   (2006.01)

(52) U.S. Cl.
USPC .......................................... 349/200; 349/15

(58) Field of Classification Search .............. 349/200, 349/15
See application file for complete search history.

(56) References Cited

U.S. PATENT DOCUMENTS 7,250,923 B2 *   7/2007   Taira et al. ...................... 345/6
7,532,272 B2 *   5/2009   Woodgate et al. ............. 349/95
2007/0296911 A1 * 12/2007   Hong ............................ 349/200

FOREIGN PATENT DOCUMENTS

JP    2008-009370    1/2008

* cited by examiner

*Primary Examiner* — Mike Qi
(74) *Attorney, Agent, or Firm* — Rader, Fishman & Grauer PLLC

(57) ABSTRACT

A stereoscopic display device includes a display panel performing image display, and a lens array element including a first electrode, a second electrode opposed to the first electrode, and a liquid crystal layer disposed between the first electrode and the second electrode, the lens array element being configured in such a manner that a lens effect on display image light from the display panel is controlled depending on a voltage applied to the first electrode and a voltage applied to the second electrode. One of the first electrode and the second electrode is structured to allow an electric field to be applied to the liquid crystal layer for each of a plurality of predetermined sub-regions, individually.

11 Claims, 24 Drawing Sheets

A

B

A

FIG. 13A
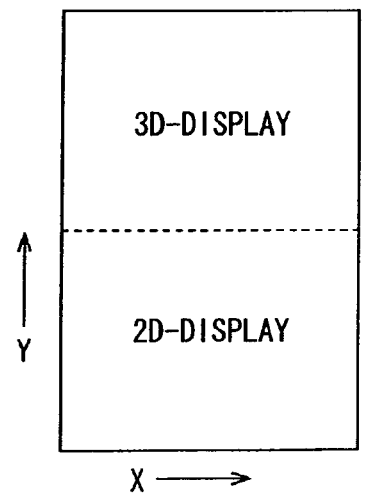
A
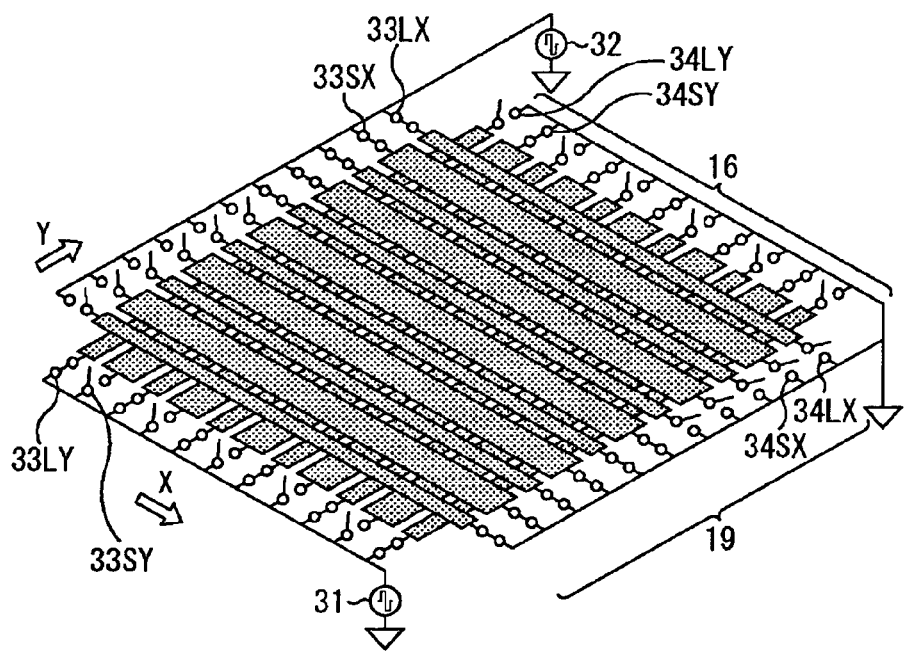
FIG. 13B

A

B

| | SECOND ELECTRODE GROUP | | FIRST ELECTRODE GROUP | |
|---|---|---|---|---|
| | FIRST ELECTRODE 19LX (ELECTRODE WIDTH Lx) | SECOND ELECTRODE 19SX (ELECTRODE WIDTH Sx) | FIRST ELECTRODE 16LY (ELECTRODE WIDTH Ly) | SECOND ELECTRODE 16SY (ELECTRODE WIDTH Sy) |
| Y-DIRECTION CYLINDRICAL LENS | X-LINE GENERATOR (RECTANGULAR WAVE WITH AMPLITUDE Vx) | X-LINE GENERATOR (RECTANGULAR WAVE WITH AMPLITUDE Vx) | Y-LINE GENERATOR (RECTANGULAR WAVE WITH AMPLITUDE Vy) | GROUNDED |
| NO LENS EFFECT | GROUNDED | GROUNDED | GROUNDED | GROUNDED |
| X-DIRECTION CYLINDRICAL LENS | X-LINE GENERATOR (RECTANGULAR WAVE WITH AMPLITUDE Vx) | GROUNDED | Y-LINE GENERATOR (RECTANGULAR WAVE WITH AMPLITUDE Vy) | Y-LINE GENERATOR (RECTANGULAR WAVE WITH AMPLITUDE Vy) |

FIG. 16

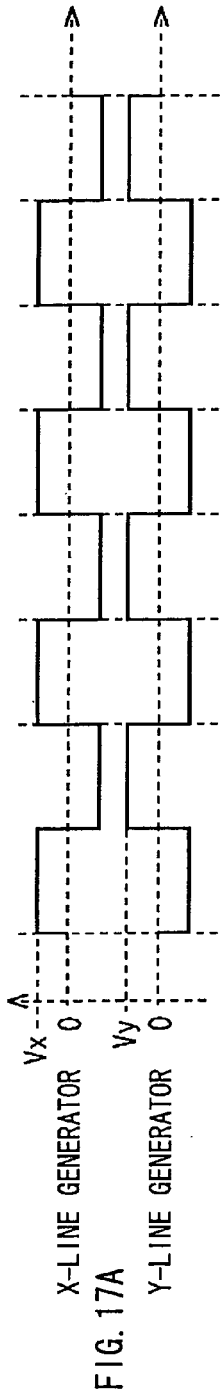
FIG. 17
FIG. 17A
X-LINE GENERATOR
Y-LINE GENERATOR
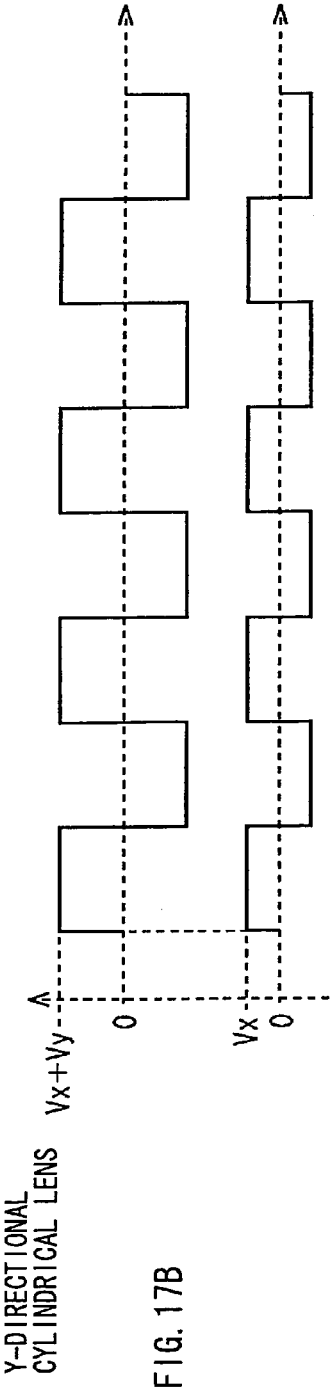
FIG. 17B
Y-DIRECTIONAL
CYLINDRICAL LENS
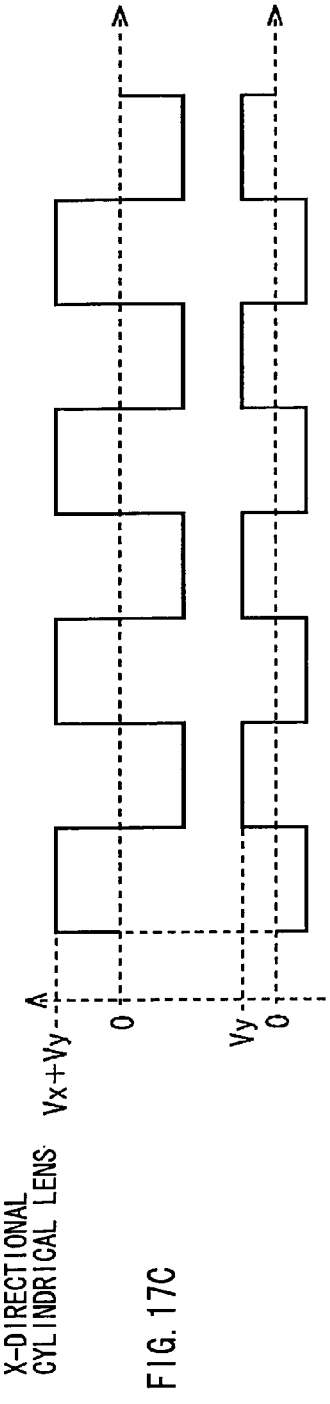
FIG. 17C
X-DIRECTIONAL
CYLINDRICAL LENS

| EXAMPLES | N | p | Lx | Sx | Ly | Sy | a | gap |
|---|---|---|---|---|---|---|---|---|
| 1 | 2 | 141 | 20 | 111 | 20 | 111 | 5 | 30 |
| 2 | 2 | 141 | 20 | 111 | 20 | 111 | 5 | 10 |
| 3 | 2 | 141 | 10 | 121 | 10 | 121 | 5 | 30 |
| 4 | 2 | 141 | 20 | 111 | 20 | 111 | 5 | 30 |
| 5 | 2 | 141 | 20 | 111 | 20 | 111 | 5 | 10 |
| 6 | 2 | 141 | 10 | 121 | 10 | 121 | 5 | 30 |

FIG. 21

| EXAMPLES | FULL-SCREEN 2D DISPLAY | LANDSCAPE FULL-SCREEN 3D DISPLAY 2D/3D DIVIDED DISPLAY | PORTRAIT FULL-SCREEN 3D DISPLAY 2D/3D DIVIDED DISPLAY | AMPLITUDE VOLTAGE (Vx=Vy=V/2) | OFF RESPONSE TIME (sec) |
|---|---|---|---|---|---|
| 1 | VERY GOOD | VERY GOOD | GOOD (MOIRE) | 2.5 | 1 |
| 2 | VERY GOOD | GOOD | GOOD (MOIRE) | 2.0 | 0.5 |
| 3 | VERY GOOD | VERY GOOD | GOOD (MOIRE) | 2.5 | 1 |
| 4 | VERY GOOD | VERY GOOD | GOOD | 2.5 | 1 |
| 5 | VERY GOOD | GOOD | GOOD | 2.0 | 0.5 |
| 6 | VERY GOOD | VERY GOOD | GOOD | 2.5 | 1 |

FIG. 23

LENS ARRAY ELEMENT AND IMAGE DISPLAY DEVICE

BACKGROUND OF THE INVENTION

1. Field of the Invention

The invention relates to a lens array element and an image display device, and particularly relates to a lens array element electrically controlling generation of a lens effect for achieving three-dimensional display, and an image display device using the lens array element.

2. Description of Related Art

A method of achieving stereoscopy has been known in the past, where a parallax image causing parallax between both eyes of a viewer is shown for stereoscopy, which includes a method where a viewer needs to use special glasses for achieving stereoscopy, and a method where a viewer need not use the glasses.

The method needing the glasses is used, for example, for a projector in a movie theater or a television image receiver. The method needing no special glasses is expected to be used for a television image receiver, and a display of a portable electronic-instrument such as a mobile phone, a smartphone, or a netbook computer.

A specific way of achieving the method needing no special glasses may include an optical device for three-dimensional display assembled on a screen of a two-dimensional display device such as liquid crystal display, the optical device deflecting display image light from the two-dimensional display device to multiple view angle directions.

The optical device for three-dimensional display includes a lens array having a plurality of cylindrical lenses arranged in parallel, as well known. For example, in the case of binocular stereoscopy, different parallax images are shown to both eyes of a viewer, thereby the viewer senses a stereoscopic effect. To achieve this, a plurality of cylindrical lenses extending in a vertical direction are arranged in parallel in a horizontal direction with respect to a display surface of a two-dimensional display device, so that display image light from the two-dimensional display device is deflected in the horizontal direction, and thus horizontal parallax images appropriately arrive at both eyes of a viewer.

In addition to the cylindrical lenses, a changeable lens array element using liquid crystal lenses has been known (hereinafter, called liquid-crystal lens array element) is known (for example, see Japanese Unexamined Patent Application Publication No. 2008-9370).

The liquid-crystal lens array element may electrically switch between presence and absence of a lens effect similar to that of the cylindrical lenses. Therefore, the liquid-crystal lens array element is provided on a screen of a two-dimensional display device, enabling switching between two display modes, a two-dimensional display mode due to a no-lens-effect state and a three-dimensional display mode due to a lens-effect state.

SUMMARY OF THE INVENTION

As described before, three-dimensional display using the liquid-crystal lens array element is expected to be used for a portable electronic-instrument such as smartphone. In such a case, the following demand is desirably satisfied.

That is, a display of the electronic instrument includes one that may be used while a display state thereof is switched between a portrait state (an aspect ratio of a screen is large in vertical direction) and a landscape state (an aspect ratio of a screen is large in horizontal direction). Therefore, it is demanded that three-dimensional display may be achieved regardless of such a display state.

In addition, it is convenient that the whole screen is collectively changed into the two-dimensional or three-dimensional display mode, and besides a region of the two-dimensional display mode and a region of the three-dimensional display mode are provided on a screen at a time.

Generally, three-dimensional display is low in resolution compared with two-dimensional display. Therefore, it is likely that a picture portion, being requested to have high resolution, is in the two-dimensional display mode, and other portions are in the three-dimensional display mode. Moreover, it is likely that a region for displaying a shot including a portion, being not necessary to be in the three-dimensional display, is partially in the two-dimensional display mode. For example, it is likely that when a movie with subtitles is three-dimensionally displayed, a subtitle portion is in the two-dimensional display mode.

It is desirable that three-dimensional display is enabled regardless of a direction of a screen (whether a display is used in a portrait state or in a landscape state), and a region of the two-dimensional display mode and a region of the three-dimensional display mode are provided at a time on a screen.

A lens array element as a first aspect of an embodiment of the invention includes first and second substrates opposed to each other with a gap; a first electrode group formed on a side, facing the second substrate, of the first substrate, the first electrode group including a plurality of electrodes, extending in a first direction, arranged in parallel with gaps in a width direction; a first switch group connecting between a first voltage generator applying voltage to the first electrode group and the electrodes of the first electrode group; a second electrode group formed on a side, facing the first substrate, of the second substrate, the second electrode group including a plurality of electrodes, extending in a second direction different from the first direction, arranged in parallel with gaps in a width direction; a second switch group connecting between a second voltage generator applying voltage to the second electrode group and the electrodes of the second electrode group; and a liquid crystal layer disposed between the first substrate and the second substrate, the liquid crystal layer including liquid crystal molecules having refractive-index anisotropy, and generating a lens effect through change of an alignment direction of the liquid crystal molecules, the change being depending on a voltage applied to the first electrode group and a voltage applied to the second electrode group; wherein the first and/or second switch groups are/is switched, thereby the lens effect of the liquid crystal layer is changed with an optional line parallel to the first or second direction as a boundary.

It may be designed that the first and/or second switch groups are/is switched, thereby the liquid crystal layer is electrically changed, with an optional line parallel to the first or second direction as a boundary, into one of a no-lens-effect state, a first lens state inducing a first lens effect like cylindrical lenses extending in the first direction, and a second lens state inducing a second lens effect like cylindrical lenses extending in the second direction, depending on a state of the voltage applied to the first electrode group and a state of the voltage applied to the second electrode group.

It may be designed that the liquid crystal layer is in the no-lens-effect state when the plurality of electrodes configuring the first electrode group and the plurality of electrodes configuring the second electrode group have the same potential, and is in the second lens state when common voltage is applied to all the electrodes configuring the first electrode group, and drive voltage is selectively applied to only electrodes at positions corresponding to lens pitches of the second cylindrical lens among the electrodes configuring the second electrode group, and is in the first lens state when common voltage is applied to all the electrodes configuring the second electrode group, and drive voltage is selectively applied to only electrodes at positions corresponding to lens pitches of the first cylindrical lens among the electrodes configuring the first electrode group.

It may be designed that the first electrode group is configured to have a plurality of first electrodes, each having a first width and extending in the first direction, and a plurality of second electrodes, each having a second width larger than the first width and extending in the first direction, where the first electrodes and the second electrodes are alternately arranged in parallel, and the second electrode group is configured to have a plurality of second electrodes, each having a first width and extending in the second direction, and a plurality of second electrodes, each having a second width larger than the first width and extending in the second direction, where the first electrodes and the second electrodes are alternately arranged in parallel.

It may be designed that the liquid crystal layer is in the no-lens-effect state when the plurality of electrodes configuring the first electrode group and the plurality of electrodes configuring the second electrode group have the same potential, and is in the second lens state when common voltage is applied to all the electrodes configuring the first electrode group, and drive voltage is selectively applied to only the first electrodes among the electrodes configuring the second electrode group, and is in the first lens state when common voltage is applied to all the electrodes configuring the second electrode group, and drive voltage is selectively applied to only the first electrodes among the electrodes configuring the first electrode group.

It may be designed that the liquid crystal layer is in the second lens state when drive voltage is selectively applied to only the first electrodes among the electrodes configuring the second electrode group, and the second electrodes are grounded, and is in the first lens state when drive voltage is selectively applied to only the first electrodes among the electrodes configuring the first electrode group, and the second electrodes are grounded.

It may be designed that the liquid crystal layer is in the second lens state when common voltage is applied to all the electrodes configuring the first electrode group, and drive voltage is selectively applied to only the first electrodes among the electrodes configuring the second electrode group, and is in the first lens state when common voltage is applied to all the electrodes configuring the second electrode group, and drive voltage is selectively applied to only the first electrodes among the electrodes configuring the first electrode group, wherein the first drive voltage and the second drive voltage are rectangular waves having the same voltage amplitude with phases being different by 180° from each other.

It may be designed that the first electrodes included by the first electrode group are arranged with a gap corresponding to the lens pitch of the first cylindrical lens, and the first electrodes included by the second electrode group are arranged with a gap corresponding to the lens pitch of the second cylindrical lens.

It may be designed that the first direction and the second direction are perpendicular to each other, and the liquid crystal layer is electrically changed into a lens effect state in the first direction or a lens effect state in the second direction.

It may be designed that the second direction intersects with the first direction at (90°−θ), and the liquid crystal layer is electrically changed into a lens effect state in the first direction or a lens effect state in the second direction.

It may be designed that the θ satisfies $\tan^{-1}\theta = 1/3$.

In the lens array element as the first aspect of an embodiment of the invention, the first and/or second switch groups are/is switched, thereby the lens effect of the liquid crystal layer is changed with an optional line parallel to the first or second direction as a boundary.

An image display device as a second aspect of an embodiment of the invention includes a display section performing image display; a lens array element opposed to a display surface side of the display section to selectively change a passing state of beams from the display section; a detection unit detecting a direction of the display section to be used, the detection unit being opposed to the lens array element; a setting unit setting a display boundary; and a switch control unit controlling switches; wherein the lens array element includes, first and second substrates opposed to each other with a gap, a first electrode group formed on a side, facing the second substrate, of the first substrate, the first electrode group including a plurality of electrodes, extending in a first direction, arranged in parallel with gaps in a width direction, a first switch group connecting between a first voltage generator applying voltage to the first electrode group and the electrodes of the first electrode group, a second electrode group formed on a side, facing the first substrate, of the second substrate, the second electrode group including a plurality of electrodes, extending in a second direction different from the first direction, arranged in parallel with gaps in a width direction, a second switch group connecting between a second voltage generator applying voltage to the second electrode group and the electrodes of the second electrode group, and a liquid crystal layer disposed between the first substrate and the second substrate, the liquid crystal layer including liquid crystal molecules having refractive-index anisotropy, and generating a lens effect through change of an alignment direction of the liquid crystal molecules, the change being depending on a voltage applied to the first electrode group and a voltage applied to the second electrode group, and the switch control unit switches the first and/or second switch groups depending on at least one of a detected direction of the display panel being used and the display boundary being set, thereby the lens effect of the liquid crystal layer is changed with an optional line parallel to the first or second direction as a boundary.

It may be designed that the first and/or second switch groups are/is switched, thereby the liquid crystal layer is electrically changed, with the display boundary as a boundary, into one of a no-lens-effect state, a first lens state inducing a first lens effect like cylindrical lenses extending in the first direction, and a second lens state inducing a second lens effect like cylindrical lenses extending in the second direction, depending on a state of the voltage applied to the first electrode group and a state of the voltage applied to the second electrode group.

In the lens array element, two-dimensional display may be electrically switched to/from three-dimensional display by switching the no-lens-effect state to/from the first or second lens state.

It can be designed that while the lens array element is in the no-lens-effect state, display image light from the display panel is transmitted without deflection for two-dimensional display, and while the lens array element is in the first lens state, display image light from the display panel is deflected in a direction perpendicular to the first direction for three-dimensional display giving a stereoscopic effect when both eyes are turned in the direction perpendicular to the first direction, and while the lens array element is in the second lens state, display image light from the display panel is deflected in a direction perpendicular to the second direction for three-dimensional display giving a stereoscopic effect when both eyes are turned in the direction perpendicular to the second direction.

In the image display device as a second aspect of an embodiment of the invention, the switch control unit switches the first and/or second switch groups depending on at least one of a detected direction of the display panel being used and the display boundary being set, thereby the lens effect of the liquid crystal layer is changed with an optional line parallel to the first or second direction as a boundary.

According to the first aspect of the embodiment of the invention, a lens effect may be obtained, which enables three-dimensional display regardless of a direction of a screen, and enables a region of the two-dimensional display mode and a region of the three-dimensional display mode to be provided at a time on a screen.

According to the second aspect of the embodiment of the invention, three-dimensional display is enabled regardless of a direction of a screen, and a region of the two-dimensional display mode and a region of the three-dimensional display mode may be provided at a time on a screen.

Other and further objects, features and advantages of the invention will appear more fully from the following description.

BRIEF DESCRIPTION OF THE DRAWINGS

FIGS. 13A and 13B are diagrams showing a state of switching control of switches corresponding to still another use condition of a display.

FIG. 16 is a table collectively showing states of switching control of switches corresponding to use conditions of the display.

FIG. 17 is a diagram showing waveforms of voltage generated by an X-line generator and a Y-line generator.

FIG. 21 is a table showing values of parameters in the first to sixth examples.

FIG. 23 is a table showing evaluation of the first to sixth examples.

DETAILED DESCRIPTION OF THE PREFERRED EMBODIMENTS

Hereinafter, the best mode for carrying out the invention (hereinafter, called embodiment) will be described in detail with reference to drawings.

1. Embodiment

Configuration Example of Smartphone

FIG. 1 shows appearance of a smartphone as an embodiment of the invention. The smartphone 1 has a display 2 different in length between vertical and horizontal directions. The display 2 is configured of a display panel 20 as a two-dimensional display device and a liquid-crystal lens array element 10 provided on a screen of the panel 20 (both are shown in FIG. 2).

Figure 1A:
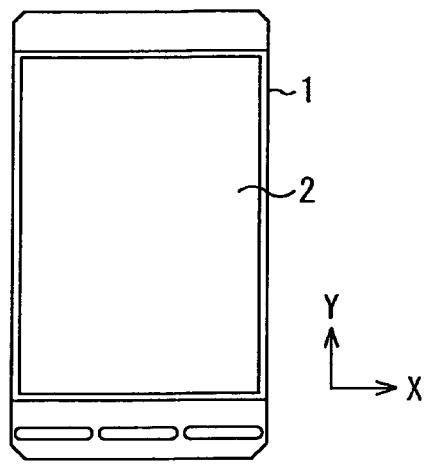
FIGS. 1A to 1C are outline drawings of a smartphone using an embodiment of the invention.
Figure 1C:
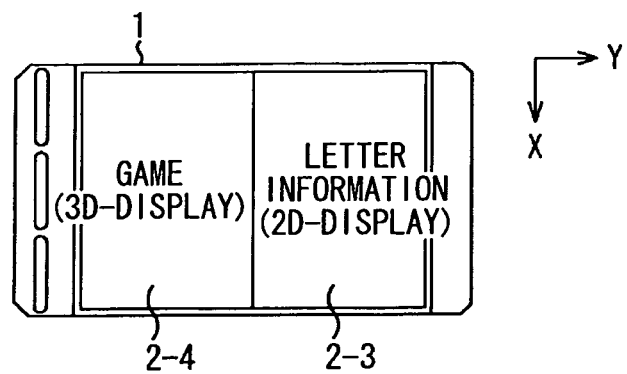
Figure 2:
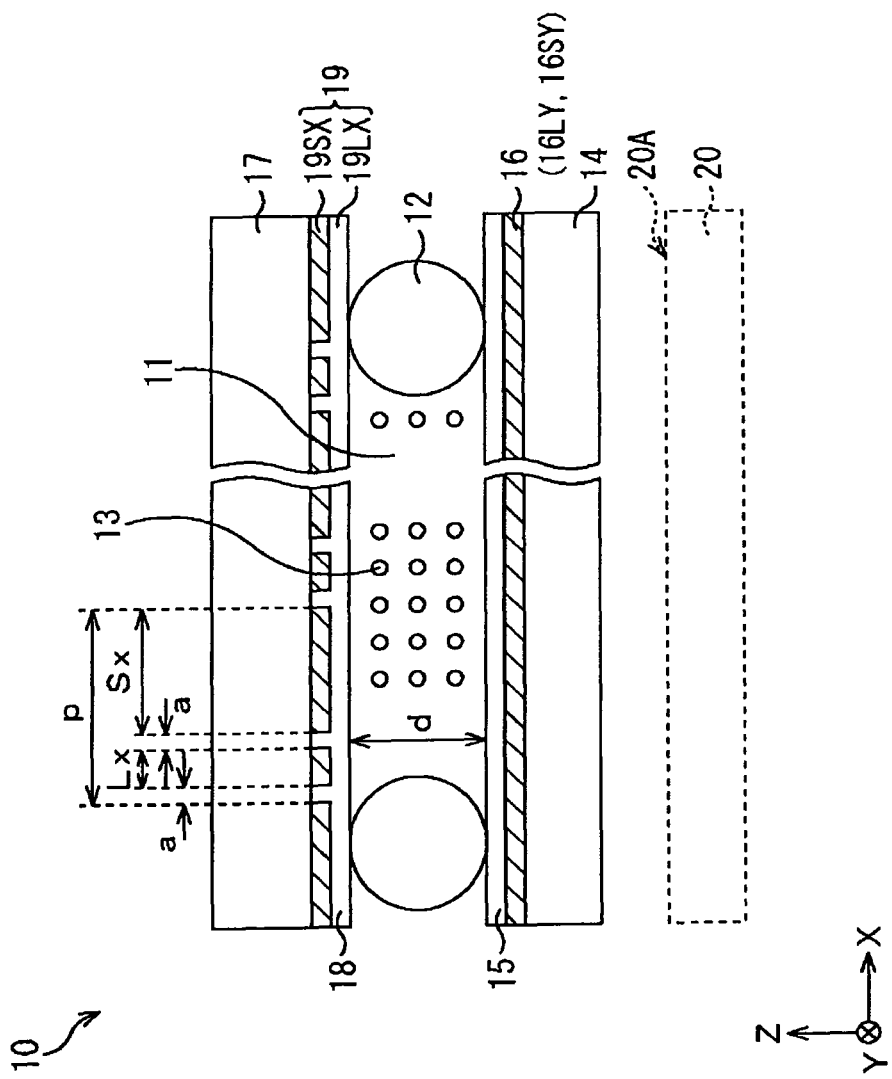
FIG. 2 is a section diagram showing a configuration example of a liquid crystal lens array element.

The smartphone 1 may be used with a body being stood, namely, with the display 2 in a portrait state as shown in FIG. 1A. In addition, the smartphone 1 may be used with a body being tilted 90 degrees, namely, in a landscape state as shown in FIG. 1C. Naturally, an angle of displayed content on the display 2 is adjusted into a direction so that such tilt of the display 2 is cancelled. Therefore, a user (viewer) of the smartphone 1 may view displayed information without unnaturalness regardless of whether a body is tilted.

Figure 1B:
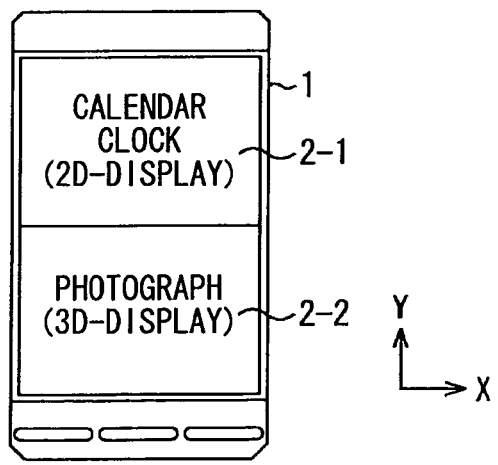

As shown in FIG. 1B, the smartphone 1 may be used while the display 2 is set in the portrait state with an upper region 2-1 of the display in a two-dimensional display mode and a lower region 2-2 thereof in a three-dimensional display mode. Thus, for example, a calendar or a watch may be two-dimensionally displayed in the upper region 2-1 of the display 2, while a photograph or the like may be three-dimensionally displayed in the lower region 2-2 at the same time. A boundary between the upper and lower regions 2-1 and 2-2 may be provided at an optional position. The smartphone 1 may be used with the upper region 2-1 in the three-dimensional display mode and the lower region 2-2 in the two-dimensional display mode.

Furthermore; as shown in FIG. 1C, the smartphone 1 may be used while the display 2 is set in the landscape state with a right region 2-3 of the display in a two-dimensional display mode and a left region 2-4 in a three-dimensional display mode. Thus, for example, optional letter information may be two-dimensionally displayed in the right region 2-3 of the display 2, while a screen of a game or the like may be three-dimensionally displayed in the left region 2-4 at the same time. A boundary between the right and left regions 2-3 and 2-4 may be provided at an optional position. The smartphone 1 may be used with the right region 2-3 in the three-dimensional display mode and the left region 2-4 in the two-dimensional display mode.

Configuration Example of Liquid-Crystal Lens Array Element 10

FIG. 2 shows a section diagram of the liquid-crystal lens array element 10 included by the display 2.

As shown in FIG. 2, the liquid-crystal lens array element 10 is provided on a display surface 20A of the display panel 20.

The liquid-crystal lens array element 10 controls a lens effect depending on a display mode, thereby selectively changes a passing state of beams from the display panel 20. The display panel 20 may be configured of a liquid crystal display, an organic EL or the like. The display panel 20 performs video display based on two-dimensional image data in a region of a two-dimensional display mode, and performs video display based on three-dimensional image data in a region of a three-dimensional display mode. The three-dimensional image data, for example, include a plurality of parallax images corresponding to a plurality of view angle directions in three-dimensional display, which are parallax image data for right-eye display and left-eye display in the case of binocular three-dimensional display.

The liquid-crystal lens array element 10 has first and second substrates 14 and 17 opposed to each other with a gap d, and a liquid crystal layer 11 disposed in between.

The first and second substrates 14 and 17 are transparent substrates including, for example, a glass or resin material. First electrode group 16 is formed on a side facing the second substrate 17 of the first substrate 14, the electrode group 16 including a plurality of transparent electrodes, extending in a first direction (X axis direction of FIG. 2), arranged in parallel with gaps in a width direction (Y axis direction of FIG. 2). Furthermore, an alignment film 15 is formed on the first substrate 14 via the first electrode group 16.

Similarly, a second electrode group 17 is formed on a side facing the first substrate 14 of the second substrate 17, including a plurality of transparent electrodes, extending in a second direction (Y axis direction of FIG. 2) different from the first direction, arranged in parallel with gaps in a width direction (X axis direction of FIG. 2). Furthermore, an alignment film 18 is formed on the second substrate 17 via the second electrode group 19.

The liquid crystal layer 11, including liquid crystal molecules 13, is controlled in lens effect by an alignment direction of the liquid crystal molecules 13 being changed depending on a voltage applied to the first electrode group 16 and a voltage applied to the second electrode group 19. In addition, by the liquid crystal layer 11, the liquid-crystal lens array element 10 may be electrically switched into one of three states, a no-lens-effect state, a first lens state, and a second lens state for each of regions depending on a state of the voltage applied to the first electrode group 16 and a state of the voltage applied to the second electrode group 19.

Each of the liquid crystal molecules 13 has refractive-index anisotropy, for example, has a structure of an index ellipsoid being different in refractive index to a transmitted beam between longitudinal and lateral directions. In the first lens state, a first lens effect like cylindrical lenses extending in the first direction occurs. In the second lens state, a second lens effect like cylindrical lenses extending in the second direction occurs.

Hereinafter, the embodiment is described with the first direction as an X direction of FIG. 2 (horizontal direction on a paper), and with the second direction as a Y direction of FIG. 2 (direction perpendicular to the paper). The X and Y directions are perpendicular to each other in a substrate surface. However, the X and Y directions are not perpendicular to each other in some case. Such a case is described later with reference to FIG. 20.

Electrode Structure of Liquid-Crystal Lens Array Element 10

Figure 3:
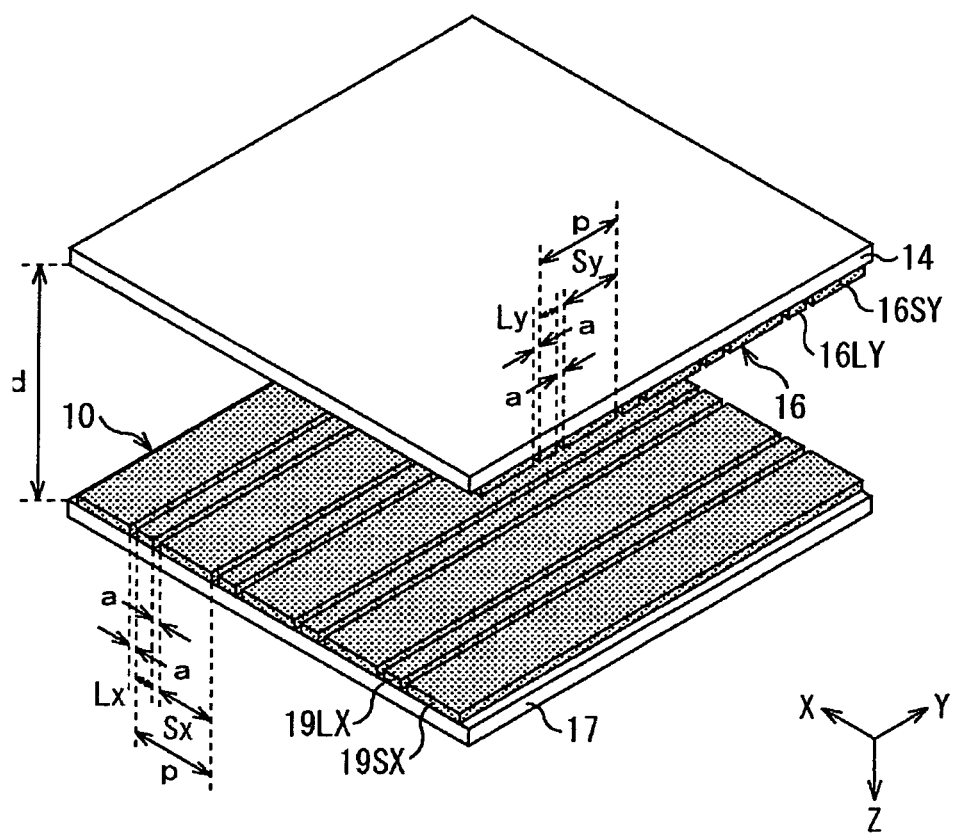
FIG. 3 is a perspective diagram showing first and second electrode groups of the liquid crystal lens array element.
Figure 4:
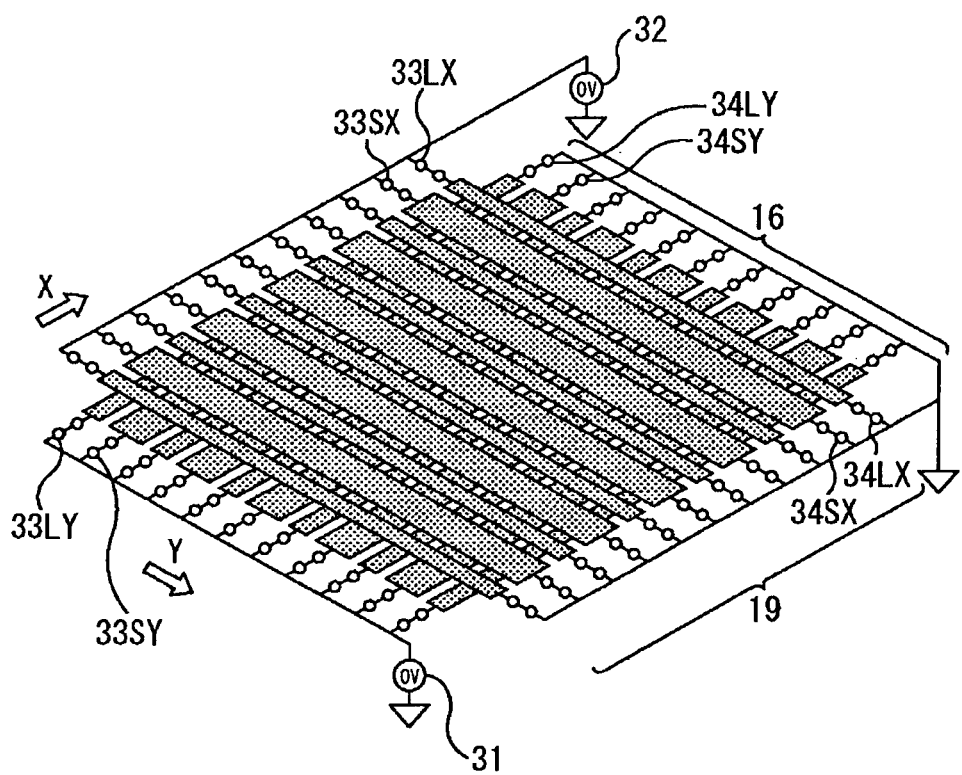
FIG. 4 is a perspective diagram showing the first and second electrode groups of the liquid crystal lens array element.

FIGS. 3 and 4 show an electrode structure of the liquid-crystal lens array element 10. FIG. 3 shows the electrode structure in an inverted manner to that in FIG. 1 or 4, namely, shows the structure with the first substrate 14 on an upper side and the second substrate 17 on a lower side.

The first electrode group 16 provided on the first substrate 14 includes the plurality of transparent electrodes including two types of electrodes, being different in width, alternately arranged in parallel. That is, the first electrode group 16 has a plurality of X-directional first-electrodes (first electrodes 16LY) and a plurality of X-directional second-electrodes (second electrodes 16SY), and the first and second electrodes 16LY and 16SY are alternately arranged in parallel.

The first electrodes 16LY extend in the first direction (X direction) with first width Ly. The second electrodes 16SY extend in the first direction with second width Sy larger than the first width Ly. The first electrodes 16LY are arranged in parallel with a periodical interval corresponding to a lens pitch p of the first cylindrical lens generated as a lens effect. Each first electrode 16LY and each second electrode 16SY are arranged with a gap a.

As shown in FIG. 4, one ends of the first electrodes 16LY elongated in the first direction are connected to an X-line generator 31 for applying a predetermined voltage to the first electrode group 16 via switches 33LY, and the other ends are grounded via switches 34LY. Similarly, one ends of the second electrodes 16SY are connected to the X-line generator 31 via switches 33SY, and the other ends are grounded via switches 34SY.

Similarly, the second electrode group 19 includes the plurality of transparent electrodes including two types of electrodes, being different in width, alternately arranged in parallel. That is, the second electrode group 19 has a plurality of Y-directional first electrodes (first electrodes 19LX) and a plurality of Y-directional second electrodes (second electrodes 19SX), and the first and second electrodes 19LX and 19SX are alternately arranged in parallel.

The first electrodes 19LX extend in the second direction (Y direction) with first width Lx. The second electrodes 19SX extend in the second direction with second width Sx larger than the first width Lx. The first electrodes 19LX are arranged in parallel with a periodical interval corresponding to a lens pitch p of the second cylindrical lens generated as a lens effect. Each first electrode 19LX and each second electrode 19SX are arranged with a gap a.

As shown in FIG. 4, one ends of the first electrodes 19LX elongated in the second direction are connected to a Y-line generator 32 for applying a predetermined voltage to the second electrode group 19 via switches 33LX, and the other ends are grounded via switches 34LX. Similarly, one ends of the second electrodes 19SX are connected to the Y-line generator 32 via switches 33SX, and the other ends are grounded via switches 34SX.

In the above configuration, a predetermined voltage is generated by the X-line generator 31 and the Y-line generator 32, and the switches 33LY and 34LY, the switches 33SY and 34SY, the switches 33LX and 34LX, and the switches 33SX and 34SX are appropriately switched, thereby an optional region of the liquid-crystal lens array element 10 may be set to the two-dimensional or three-dimensional display mode.

The predetermined voltage is not generated by the X-line generator 31 and the Y-line generator 32, namely, power is not supplied to the liquid-crystal lens array element 10, thereby the whole region of the liquid-crystal lens array element 10 may be set to the two-dimensional display mode regardless of a direction of the element.

In consideration of a typical use condition of the smartphone 1, the smartphone is expected to be used longest in a state, where the whole region of the liquid-crystal lens array element 10 is set to the two-dimensional display mode, in total operation time. Therefore, power consumption may be reduced compared with a case where power is continuously supplied to the liquid-crystal lens array element 10.

Manufacturing of Liquid-Crystal Lens Array Element 10

In manufacturing of the liquid-crystal lens array element 10, a transparent conductive film such as an ITO (Indium Tin Oxide) film is formed in a predetermined pattern on each of the first and second substrates 14 and 17 including a glass material, so that the first and second electrode groups 16 and 19 are formed. The alignment films 15 and 23 are formed by a rubbing method where a polymer compound such as polyimide is rubbed with a cloth in one direction, or by oblique evaporation of SiO or the like. Thus, major axes of the liquid crystal molecules 13 may be aligned in one direction.

A sealing compound dispersed with spacers 12 including a glass or resin material is printed on the alignment films 15 and 23 in order to keep the gap d between the first and second substrates 14 and 17 to be uniform. Then, the first substrate 14 is attached to the second substrate 16, and then the sealing compound with spacers is cured. Then, a predetermined liquid crystal material is injected from an opening of the sealing compound into a space between the first and second substrates 14 and 17, and then the opening is closed. Then, a liquid crystal composite is heated into an isotropic phase and then gradually cooled, so that the liquid-crystal lens array element 10 is completed.

In the liquid-crystal lens array element 10, as refractive anisotropy Δn of each liquid crystal molecule 13 is larger, a larger lens effect may be obtained, and therefore a liquid crystal material to be used is preferably made to have a composition having such a property. On the other hand, when a liquid crystal composite has large refractive anisotropy Δn, physical properties of the liquid crystal composite may be degraded, and viscosity of the composite is thus increased. Thus, the liquid crystal material may be hard to be injected into the space between the substrates, or may be changed into a crystal-like state at low temperature. Alternatively an internal field of a liquid crystal element may be increased, leading to increase in drive voltage of the element. Therefore, a composition of the liquid crystal material is preferably determined in the light of both productivity and the lens effect. A specific composition of the liquid crystal material is described in detail in examples described later.

Configuration Example of Liquid-Crystal Lens Array Element Controller 40

Figure 5:
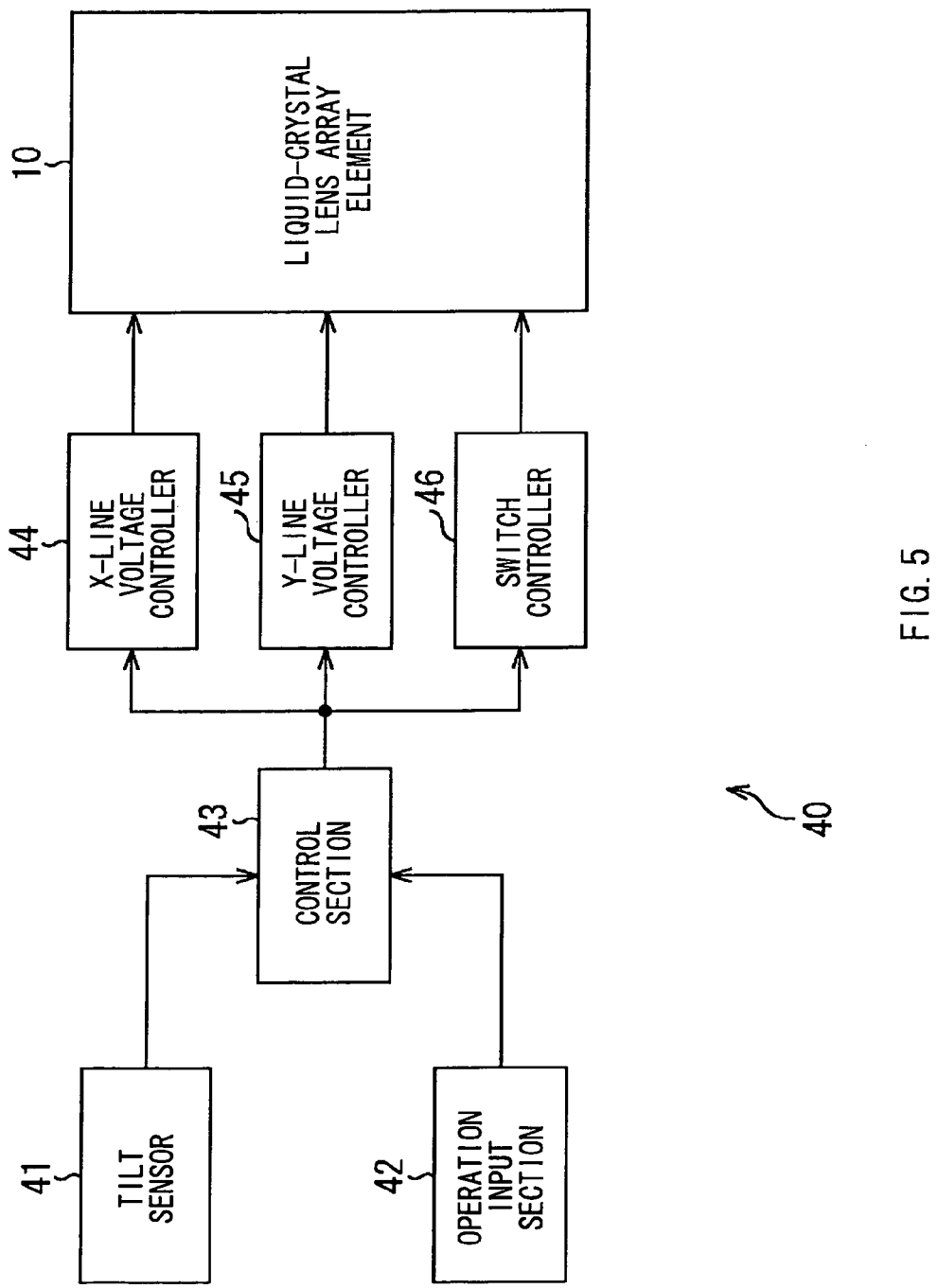
FIG. 5 is a block diagram showing a configuration example for controlling the liquid crystal lens array element.

Next, FIG. 5 shows a configuration example of a liquid-crystal lens array element controller provided within the smartphone 1 in order to control the liquid-crystal lens array element 10.

The liquid-crystal lens array element controller 40 is configured of a tilt sensor 41, an operation input section 42, a control section 43, an X-line voltage controller 44, a Y-line voltage controller 45, and a switch controller 46.

The tilt sensor 41 detects tilt of a body of the smartphone 1, and informs a detection result to the control section 43. The operation input section 42 receives user operation such as selecting a two-dimensional or three-dimensional display mode, specifying a boundary of a region as each display mode, and specifying a display direction of the display 2, and outputs an operation signal corresponding to such operation.

The control section 43 determines a display direction of the display 2, and determines a region of the two-dimensional display mode and a region of the three-two-dimensional display mode on a screen of the display 2 in accordance with the detection result of the tilt sensor 41 and the operation signal from the operation input section 42. The control section 43 may determine the above according to the detection result of the tilt sensor 41 and to control by a running application instead of the operation signal based on user operation. Furthermore, the control section 43 controls the X-line voltage controller 44, the Y-line voltage controller 45, and the switch controller 46 based on such determination.

According to control by the control section 43, the X-line voltage controller 44 controls the X-line generator 31 to be allowed to generate a predetermined voltage. According to control by the control section 43, the Y-line voltage controller 45 controls the Y-line generator 32 to be allowed to generate a predetermined voltage. According to control by the control section 43, the switch controller 46 switches the switches 33LY and 34LY, the switches 33SY and 34SY, the switches 33LX and 34LX, and the switches 33SX and 34SX connected to the first and second electrode groups 16 and 19, respectively.

Switch Control Corresponding to State and Display Mode of Display 2

Next, states of the switches 33LY and 34LY, 33SY and 34SY, 33LX and 34LX, and 33SX and 34SX corresponding to a state of the display 2 (whether the display is used in a portrait state or in a landscape state) and a display mode (two-dimensional or three-dimensional display mode) thereof are described with reference to FIGS. 6A to 16. In FIGS. 6A to 16, each of the X-line generator 31 and the Y-line generator 32 is assumed to generate a predetermined voltage (described later with reference to FIG. 17).

Figure 6A:
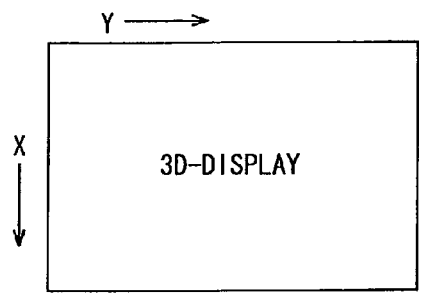
FIGS. 6A and 6B are diagrams showing a state of switching control of switches corresponding to a use condition of a display.
Figure 6B:
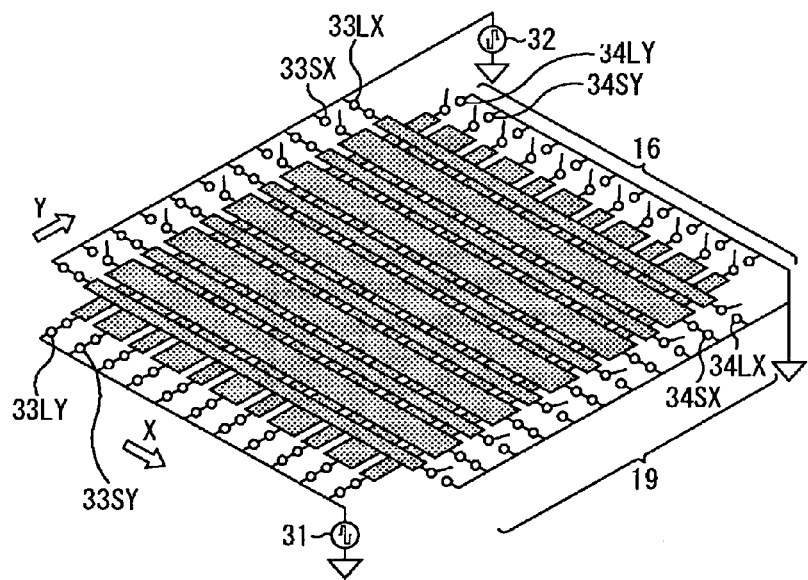

When the display 2 is used in a landscape state while the whole screen of the display is in the three-dimensional display mode as shown in FIG. 6A, all switches connected to the first electrode group 16 are on, and the switches 33SX on a Y-line generator 32 side and the switches 34LX on a ground side are off, and other switches are on among the switches connected to the second electrode group 19 as shown in FIG. 6B.

Figure 7A:
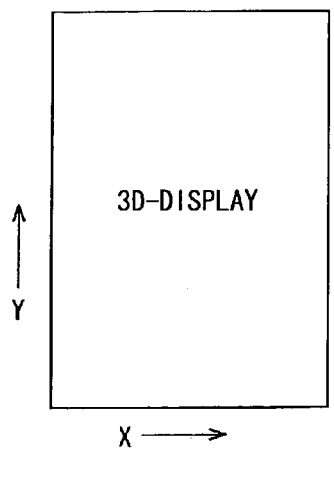
FIGS. 7A and 7B are diagrams showing a state of switching control of switches corresponding to another use condition of a display.
Figure 7B:
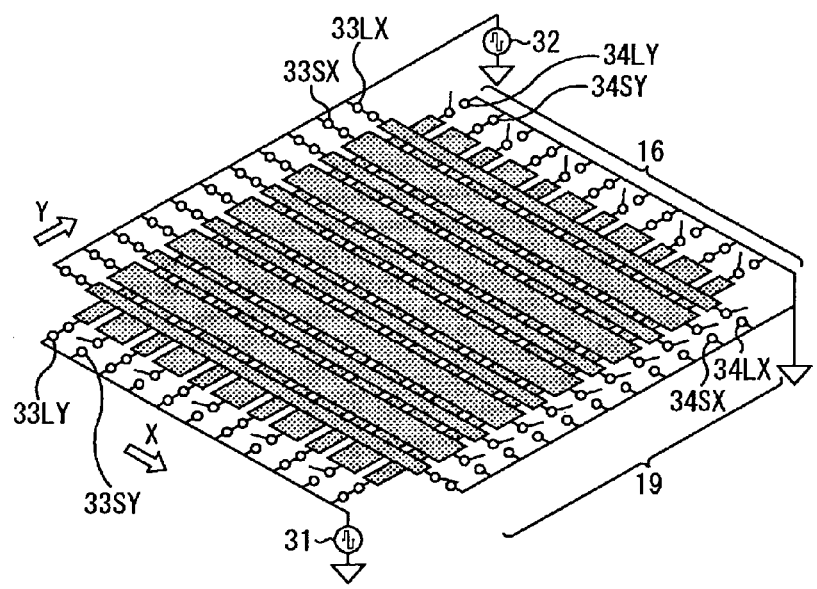

When the display 2 is used in a portrait state while the whole screen of the display is in the three-dimensional display mode as shown in FIG. 7A, the switches 33SY on an X-line generator 31 side and the switches 34LY on a ground side are off, and other switches are on among the switches connected to the first electrode group 16 as shown in FIG. 7B. In addition, all switches on a Y-line generator 32 side are off among the switches connected to the second electrode group 19.

Figure 8A:
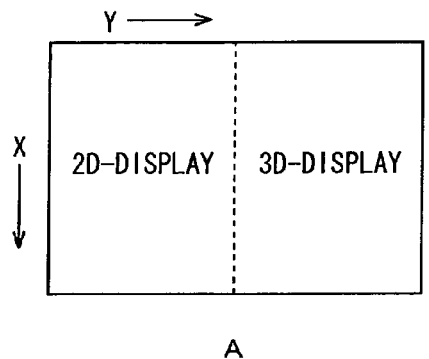
FIGS. 8A and 8B are diagrams showing a state of switching control of switches corresponding to still another use condition of a display.
Figure 8B:
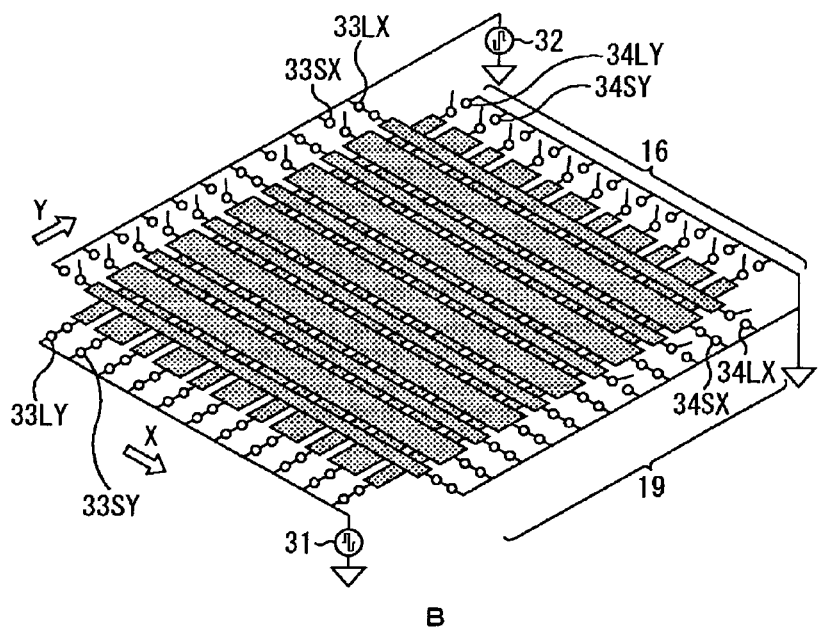

When the display 2 is used in a landscape state while a right region of the display is in the three-dimensional display mode, and a left region thereof is in the two-dimensional display mode as shown in FIG. 8A, all switches on an X-line generator 31 side are on and all switches on a ground side are off among the switches connected to the first electrode group 16, as shown in FIG. 8B. In addition, among the switches connected to the second electrode group 19, switches corresponding to a region of the two-dimensional display mode on a Y-line generator 32 side (obliquely lower left in FIG. 8B) are off, and switches 33LX are on and switches 33SX are off, the switches 33LX and 33SX being corresponding to a region of the three-dimensional display mode (obliquely upper right in FIG. 8B). Furthermore, among the switches connected to the second electrode group 19, switches corresponding to a region of the two-dimensional display mode on a ground side are off, and switches 34LX are off and switches 34SX are on, the switches 34LX and 34SX being corresponding to a region of the three-dimensional display mode.

Figure 9A:
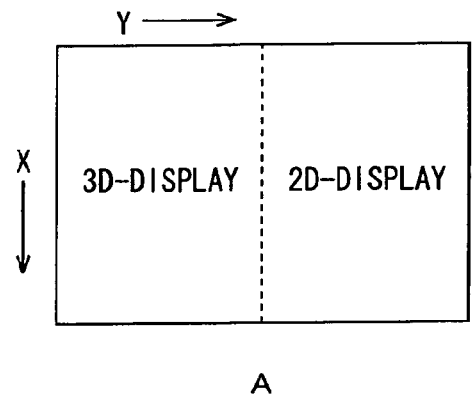
FIGS. 9A and 9B are diagrams showing a state of switching control of switches corresponding to still another use condition of a display.
Figure 9B:
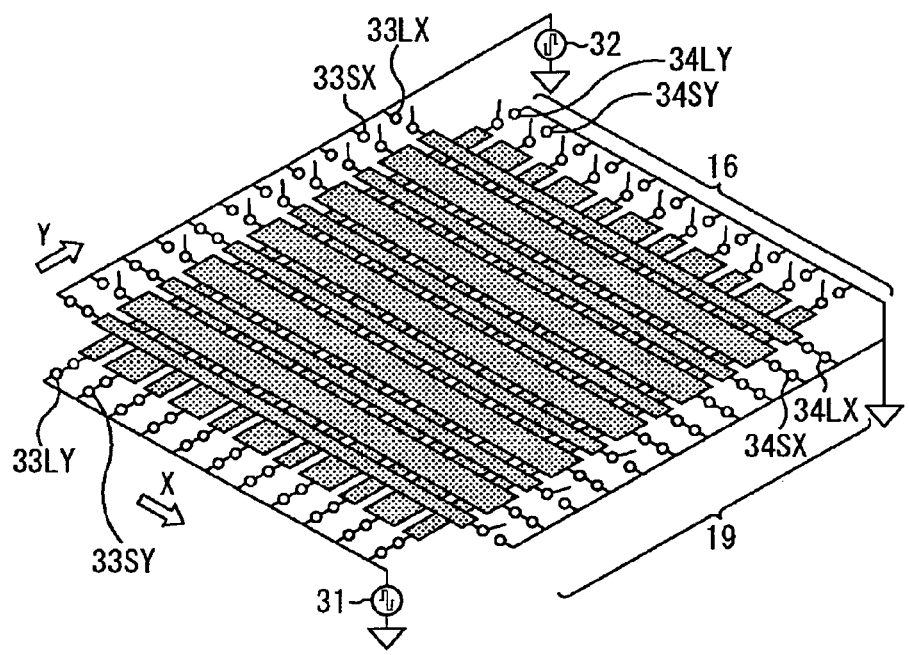

When the display 2 is used in a landscape state while a right region of the display is in the two-dimensional display mode, and a left region thereof is in the three-dimensional display mode as shown in FIG. 9A, all switches on an X-line generator 31 side are on, and all switches on a ground side are off among the switches connected to the first electrode group 16, as shown in FIG. 9B. In addition, among the switches connected to the second electrode group 19, switches corresponding to a region of the two-dimensional display mode on a Y-line generator 32 side (obliquely upper right in FIG. 9B) are off, and switches 33LX are on and switches 33SX are off, the switches 33LX and 33SX being corresponding to a region of the three-dimensional display mode (obliquely lower left in FIG. 9B). Furthermore, among the switches connected to the second electrode group 19, switches corresponding to a region of the two-dimensional display mode on a ground side are off, and switches 34LX are off and switches 34SX are on, the switches 34LX and 34SX being corresponding to a region of the three-dimensional display mode.

Figure 10A:
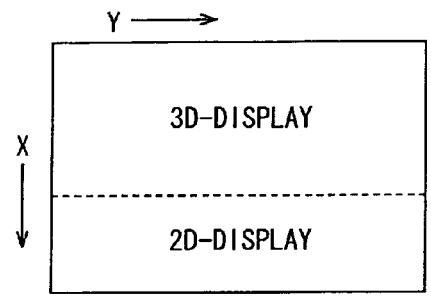
FIGS. 10A and 10B are diagrams showing a state of switching control of switches corresponding to still another use condition of a display.
Figure 10B:
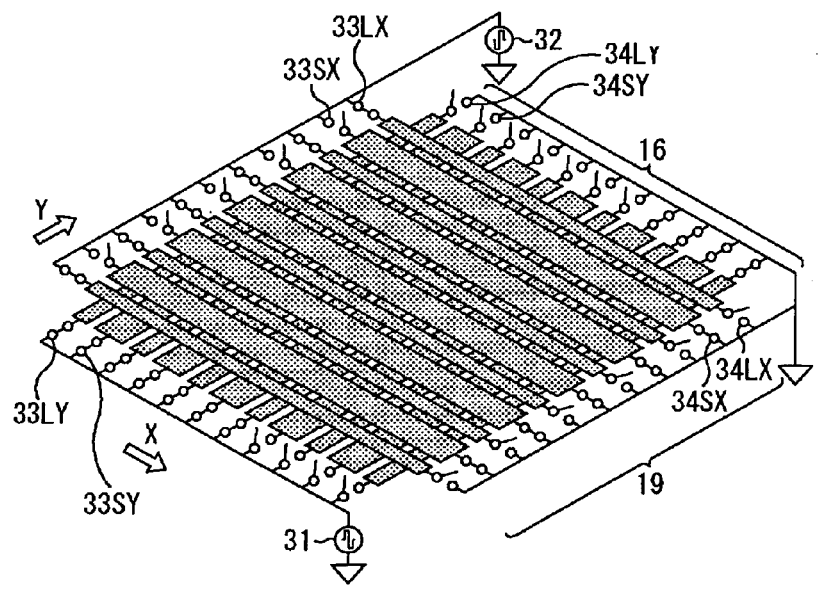

When the display 2 is used in a landscape state while an upper region of the display is in the three-dimensional display mode, and a lower region thereof is in the two-dimensional display mode as shown in FIG. 10A, among the switches connected to the first electrode group 16, switches corresponding to a region of the three-dimensional display mode on an X-line generator 31 side (obliquely upper left in FIG. 10B) are on, and switches corresponding to a region of the two-dimensional display mode (obliquely lower right in FIG. 10B) on the side are off, as shown in FIG. 10B. In addition, among the switches connected to the first electrode group 16, switches corresponding to a region of the three-dimensional display mode on a ground side are off, and switches corresponding to a region of the two-dimensional display mode are off. Furthermore, among the switches connected to the second electrode group 19, switches 33LX on a Y-line generator 32 side are on and switches 33SX on the side are off. Moreover, among the switches connected to the second electrode group 19, switches 34LX on a ground side are off and switches 34SX on the side are on.

Figure 11A:
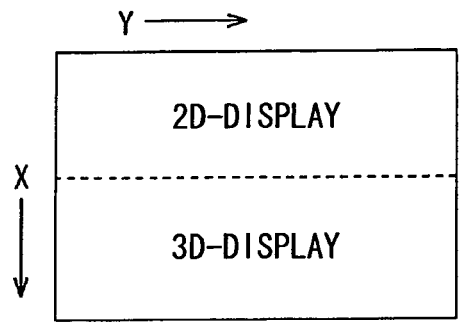
FIGS. 11A and 11B are diagrams showing a state of switching control of switches corresponding to still another use condition of a display.
Figure 11B:
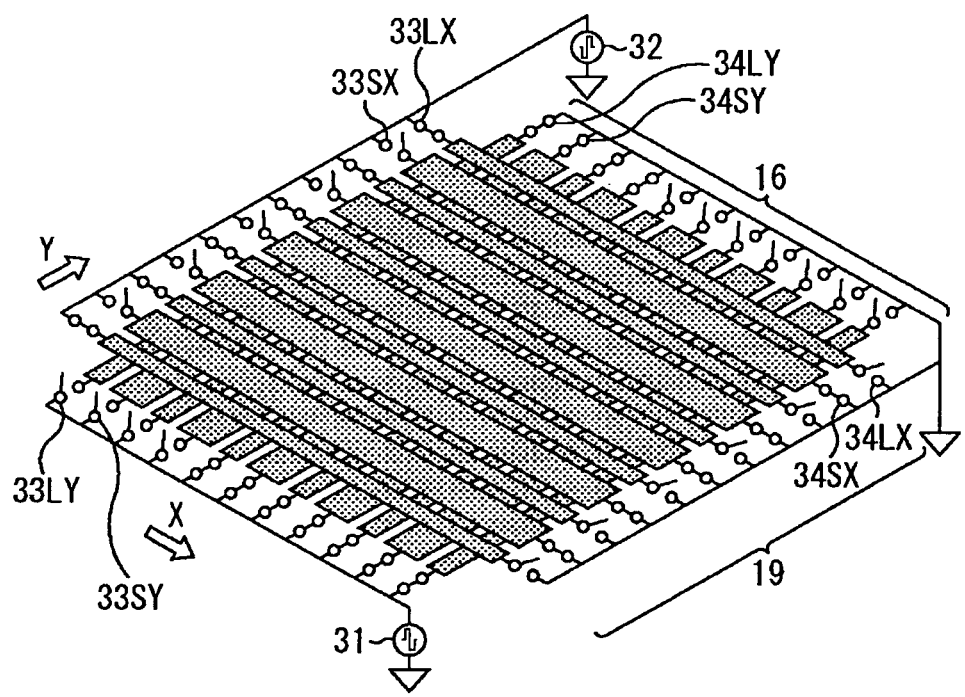

When the display 2 is used in a landscape state while an upper region of the display is in the two-dimensional display mode, and a lower region thereof is in the three-dimensional display mode as shown in FIG. 11A, among the switches connected to the first electrode group 16, switches corresponding to a region of the three-dimensional display mode on an X-line generator 31 side (obliquely lower right in FIG. 11B) are on, and switches corresponding to a region of the two-dimensional display mode on the side (obliquely upper left in FIG. 11B) are off, as shown in FIG. 11B. In addition, among the switches connected to the first electrode group 16, switches corresponding to a region of the three-dimensional display mode on a ground side are off, and switches corresponding to a region of the two-dimensional display mode are off. Furthermore, among the switches connected to the second electrode group 19, switches 33LX on a Y-line generator 32 side are on, and switches 33SX on the side are off. Moreover, among the switches connected to the second electrode group 19, switches 34LX on a ground side are off, and switches 34SX on the side are on.

Figure 12A:
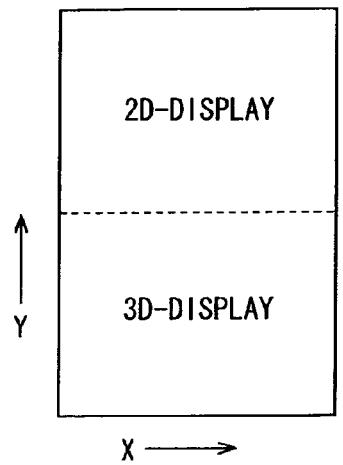
FIGS. 12A and 12B are diagrams showing a state of switching control of switches corresponding to still another use condition of a display.

When the display 2 is used in a portrait state while an upper region of the display is in the two-dimensional display mode, and a lower region thereof is in the three-dimensional display mode as shown in FIG. 12A, among the switches connected to the first electrode group 16, switches 33LY on an X-line generator 31 side are on, and switches 33SY on the side are off as shown in FIG. 11B. Moreover, among the switches connected to the first electrode group 16, switches 34LY on a ground side are off, and switches 34SY on the side are on. Furthermore, among the switches connected to the second electrode group 19, switches corresponding to a region of the two-dimensional display mode on a Y-line generator 32 side (obliquely upper right in FIG. 12B) are off, and switches corresponding to a region of the three-dimensional display mode on the side (obliquely lower left in FIG. 12B) are on. Moreover, among the switches connected to the second electrode group 19, switches corresponding to a region of the two-dimensional display mode on a ground side are on, and switches corresponding to a region of the three-dimensional display mode on the side are off.

Figure 12B:
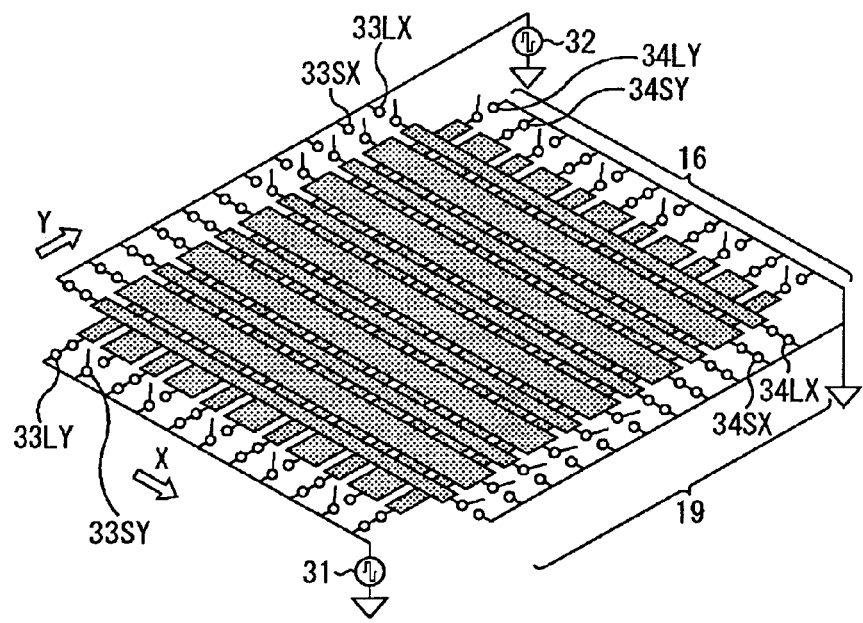

When the display 2 is used in a portrait state while an upper region of the display is in the three-dimensional display mode, and a lower region thereof is in the two-dimensional display mode as shown in FIG. 13A, among the switches connected to the first electrode group 16, switches 33LY on an X-line generator 31 side are on, and switches 33SY on the side are off, as shown in FIG. 12B. Moreover, among the switches connected to the first electrode group 16, switches 34LY on a ground side are off, and switches 34SY on the side are on. Furthermore, among the switches connected to the second electrode group 19, switches corresponding to a region of the two-dimensional display mode on a Y-line generator 32 side (obliquely lower left in FIG. 13B) are off, and switches corresponding to a region of the three-dimensional display mode on the side (obliquely upper right in FIG. 13B) are off. Moreover, among the switches connected to the second electrode group 19, switches corresponding to a region of the two-dimensional display mode on a ground side are on, and switches corresponding to a region of the three-dimensional display mode on the side are off.

Figure 14A:
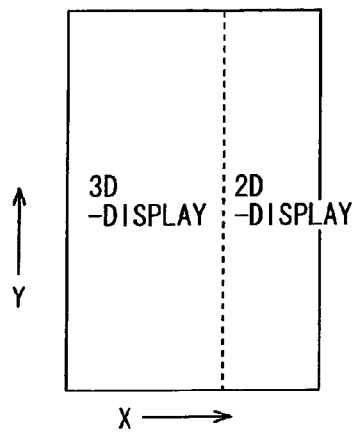
FIGS. 14A and 14B are diagrams showing a state of switching control of switches corresponding to still another use condition of a display.
Figure 14B:
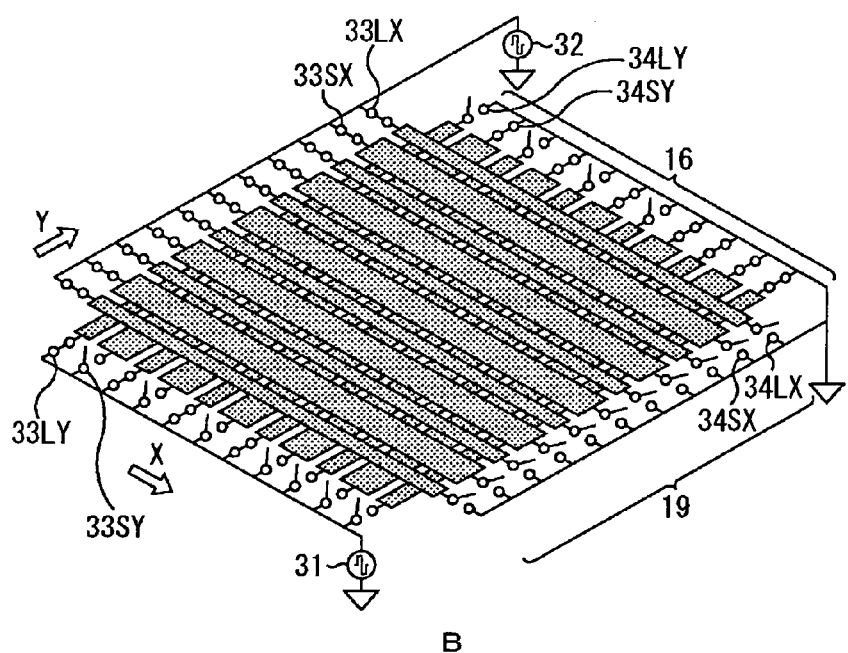

When the display 2 is used in a portrait state while a right region of the display is in the two-dimensional display mode, and a left region thereof is in the three-dimensional display mode as shown in FIG. 14A, among the switches connected to the first electrode group 16, switches corresponding to a region of the two-dimensional display mode on an X-line generator 31 side (obliquely lower right in FIG. 14B) are off, and switches 33LY are on and switches 33SY are off among switches corresponding to a region of the three-dimensional display mode (obliquely upper left in FIG. 14B) on the generator 31 side, as shown in FIG. 14B. In addition, among the switches connected to the first electrode group 16, switches corresponding to a region of the two-dimensional display mode on a ground side are on, and switches 34LY are off and switches 34SY are on among switches corresponding to a region of the three-dimensional display mode on the ground side. Furthermore, among the switches connected to the second electrode group 19, all switches on a Y-line generator 32 side are on, and all switches on a ground side are off.

Figure 15A:
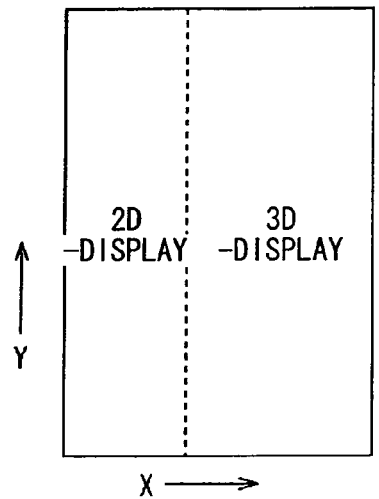
FIGS. 15A and 15B are diagrams showing a state of switching control of switches corresponding to still another use condition of a display.
Figure 15B:
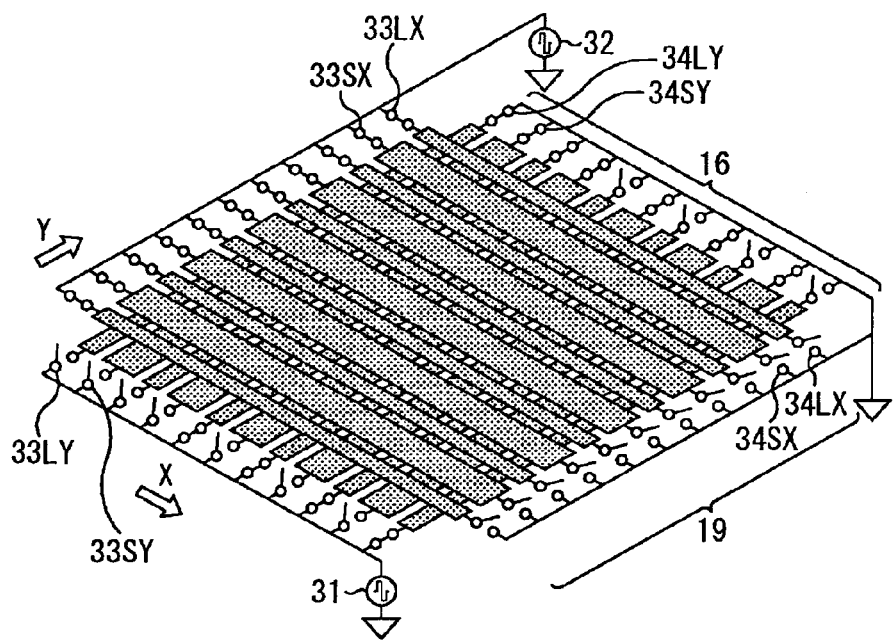

When the display 2 is used in a portrait state while a right region of the display is in the three-dimensional display mode, and a left region thereof is in the two-dimensional display mode as shown in FIG. 15A, among the switches connected to the first electrode group 16, switches corresponding to a region of the two-dimensional display mode on an X-line generator 31 side (obliquely upper left in FIG. 15B) are off, and switches 33LY are on and switches 33SY are off among switches corresponding to a region of the three-dimensional display mode (obliquely lower right in FIG. 15B) on the generator 31 side, as shown in FIG. 15B. In addition, among the switches connected to the first electrode group 16, switches corresponding to a region of the two-dimensional display mode on a ground side are on, and switches 34LY are off and switches 34SY are on among switches corresponding to a region of the three-dimensional display mode on the side. Furthermore, among the switches connected to the second electrode group 19, all switches on a Y-line generator 32 side are on, and all switches on a ground side are off.

FIG. 16 shows a correspondence relationship between a voltage application condition of each electrode and a generated lens effect in the liquid-crystal lens array element 10 as shown in FIGS. 6A to 15B.

As described hereinbefore, according to the liquid-crystal lens array element 10 of the embodiment, the three-dimensional display mode may be achieved regardless of a state (portrait or landscape state) of the display 2, and a display screen may be dividedly used between a region of the three-dimensional display mode and a region of the two-dimensional display mode.

Voltage Generated by X-Line Generator 31 and Y-Line Generator 32

Next, voltage generated by each of the X-line generator 31 and the Y-line generator 32 is described with reference to FIG. 17.

Part A of FIG. 17 shows an example of a voltage waveform generated by each of the X-line generator 31 and the Y-line generator 32. As shown in Part A of FIG. 17, for example, the X-line generator 31 generates a rectangular wave voltage of 30 Hz or more in order of +Vx, −Vx, +Vx, −Vx, . . . . On the other hand, the Y-line generator 32 generates a rectangular wave voltage with the same period in order of −Vy, +Vy, −Vy, +Vy, . . . . That is, the X-line generator 31 and the Y-line generator 32 generate voltages having approximately the same amplitude (Vx=Vy) with a phase offset of 180°.

Part B of FIG. 17 shows potential between electrodes in a vertical direction corresponding to the state shown in FIG. 6A. In particular, an upper part of Part B of FIG. 17 shows a voltage waveform in portions corresponding to first electrodes 19LX of the second electrode group 19, and a lower part of Part B of FIG. 17 shows a voltage waveform in portions corresponding to second electrodes 19SX thereof.

When the state of FIG. 6A is achieved, a predetermined potential difference is generated between the upper and lower transparent electrodes sandwiching the liquid crystal layer 11 such that alignment of the liquid crystal molecules 13 may be changed in the portions corresponding to the first electrodes 19LX of the second electrode group 19.

Specifically, all switches on an X-line generator 31 side of electrodes configuring the first electrode group 16 are on to be applied with a common voltage (amplitude Vx). In addition, among a plurality of electrodes configuring the second electrode group 19, only the first electrodes 19LX are connected to the Y-line generator 32 so as to be selectively applied with a voltage (amplitude Vy). In addition, the second electrodes 19SX are grounded among the electrodes configuring the second electrode group 19.

When the X-line generator 31 and the Y-line generator 32 generate voltages as shown in Part A of FIG. 17, a rectangular wave having an amplitude voltage of (Vx+Vy) is applied between the first electrodes 19LX of the second electrode group 19 and electrodes of the first electrode group 16 in portions corresponding to the first electrodes 19LX as shown in an upper part of Part B of FIG. 17. On the other hand, a rectangular wave having an amplitude voltage of Vx=Vy= (Vx+Vy)/2 is applied between the second electrodes 19SX of the second electrode group 19 and electrodes of the first electrode group 16 in portions corresponding to the second electrodes 19SX as shown in a lower part of Part B of FIG. 17. At that time, in the portions corresponding to the second electrode 19SX, when the amplitude voltage is equal to or lower than a threshold voltage of liquid crystal, while movement of the liquid crystal molecules 13 does not actually occur, initial orientation distribution of the liquid crystal molecules 13, namely, refractive-index distribution may be induced by a transverse electric-field caused by the second electrodes 19SX.

Part C of FIG. 17 shows potential between electrodes in a vertical direction corresponding to the state shown in FIG. 7A. In particular, an upper part of Part C of FIG. 17 shows a voltage waveform in portions corresponding to first electrodes 16LY of the first electrode group 16, and a lower part of Part C of FIG. 17 shows a voltage waveform in portions corresponding to second electrodes 16SX thereof.

When the state of FIG. 7A is achieved, a predetermined potential difference is generated between the upper and lower transparent electrodes sandwiching the liquid crystal layer 11 such that alignment of the liquid crystal molecules 13 may be changed in the portions corresponding to the first electrodes 16LY of the first electrode group 16.

Specifically, all switches on a Y-line generator 32 side of electrodes configuring the second electrode group 19 are on so that a common voltage (amplitude Vy) is applied to the electrodes. In addition, among a plurality of electrodes configuring the first electrode group 16, only the first electrodes 16LY are connected to the X-line generator 31 so as to be selectively applied with a voltage (amplitude Vx). In addition, the second electrodes 16SY are grounded among the electrodes configuring the first electrode group 16.

When the X-line generator 31 and the Y-line generator 32 generate voltages as shown in Part A of FIG. 17, a rectangular wave having an amplitude voltage of (Vx+Vy) is applied between the first electrodes 16LY of the first electrode group 16 and electrodes of the second electrode group 19 in portions corresponding to the first electrodes 16LY as shown in an upper part of Part C of FIG. 17. On the other hand, a rectangular wave having an amplitude voltage of Vx=Vy=(Vx+ Vy)/2 is applied between the second electrodes 16SY of the first electrode group 16 and electrodes of the second electrode group 19 in portions corresponding to the second electrodes 16SY as shown in a lower part of Part C of FIG. 17. At that time, in the portions corresponding to the second electrodes 16SY, when the amplitude voltage is equal to or lower than the threshold voltage of liquid crystal, while movement of the liquid crystal molecules 13 does not actually occur, initial orientation distribution of the liquid crystal molecules 13, namely, refractive-index distribution may be induced by a transverse electric-field caused by the second electrodes 16SY.

When the liquid crystal layer 3 as a whole is into the no-lens-effect state, a voltage state can be preferably adjusted such that all the electrodes configuring the first electrode group 16 and all the electrodes configuring the second electrode group 19 have the same potential (0V). That is, as shown in FIG. 4, while the X-line generator 31 and the Y-line generator 32 generate the same voltage of 0 V, the respective electrodes are grounded. In this case, the liquid crystal molecules 13 are uniformly aligned in a predetermined direction determined by the alignment films 15 and 18, leading to a no-lens-effect state.

EXAMPLES

Next, a specific example of the smartphone 1 as the embodiment is described.

For the liquid-crystal lens array element 10, as described before, the first electrode group 16 and the second electrode group 19, including ITO, are formed by a photolithography method and wet or dry etching as well known between the first and second substrates 14 and 17 including a glass material or the like. Polyimide is spin-coated on the electrodes of each electrode group and baked, resulting in formation of the alignment films 15 and 18.

After baking the material, rubbing is performed on surfaces of the alignment films 15 and 18, and the surfaces are cleaned with IPA or the like and then dried by heating. After cooling, the first substrate 14 is attached to the second substrate 17 with a gap of about 30 to 50 µm with rubbing directions being aligned with each other. The gap is held by spacers dispersed over the whole surface. Then, a liquid crystal material is injected from an opening of a sealing compound by a vacuum injection method, and then the opening is closed. Then, a liquid crystal cell is heated into an isotropic phase and then gradually cooled.

The liquid crystal material used for the liquid crystal layer 11 is a typical nematic liquid crystal, MBBA(p-methoxybenzylidene-p'-butylaniline). Refractive-index anisotropy Δn of the material is 0.255 at 20° C.

Chemical formula 1

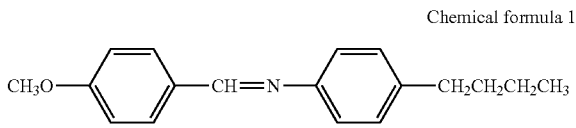

For the display panel 20, a TFT-LCD panel with a pixel size of 70.5 µm is used. In the display panel 20, pixels of R, G and B are arranged in a matrix. In addition, the number of pixels of the display panel 20 is N (2 or more) with respect to a pitch p of cylindrical lenses formed by the liquid-crystal lens array element 10. In a region of the three-dimensional display mode, N is presented as the number of beams (number of visual axes). As the display panel 20, a 3-inch WVGA panel (864*480 pixels) is used.

Figure 19A:
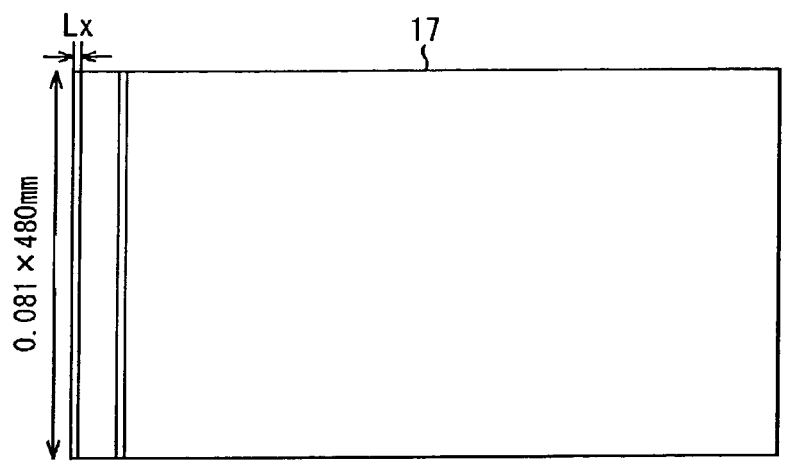
FIGS. 19A and 19B are diagrams, showing an angle of a first electrode group and an angle of a second electrode group, corresponding to first to third examples.
Figure 19B:
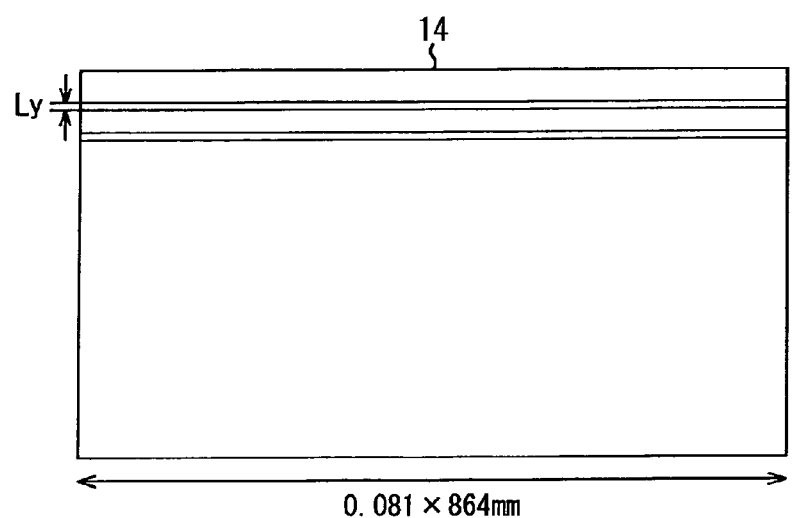

FIGS. 19A and 19B show electrode structures of a liquid-crystal lens array element 10 corresponding to first to third examples described later, wherein FIG. 19A shows an electrode structure on a second substrate 17 side, and FIG. 19B shows an electrode structure on a first substrate 14 side. As shown in FIGS. 19A and 19B, electrodes on the substrate 14 and electrodes on the second substrate 17 are perpendicularly formed to each other in the first to third examples.

Figure 18:
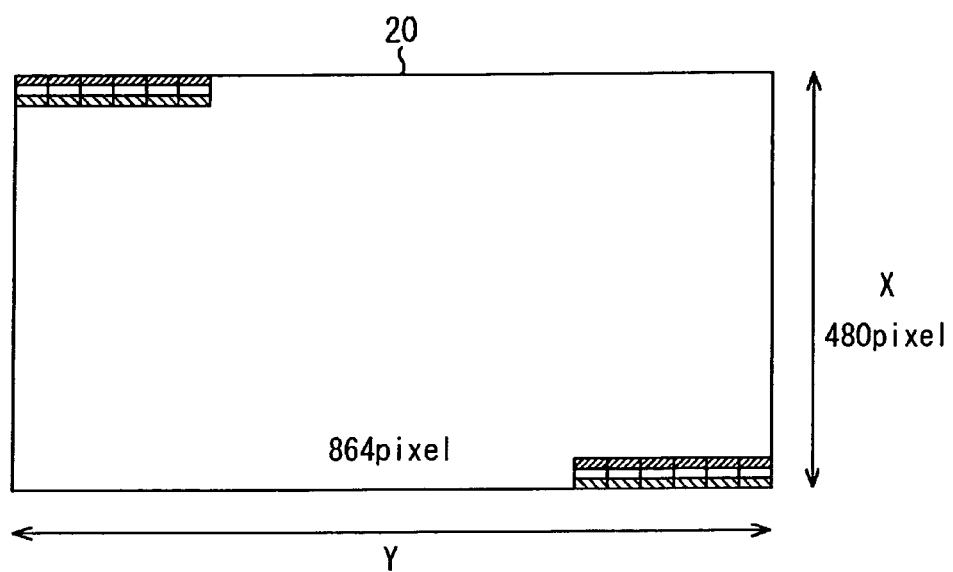
FIG. 18 is a diagram showing an example of a display panel.

When the electrodes on the first substrate 14 and the electrodes on the second substrate 17 are perpendicular to each other as shown in FIGS. 19A and 19B, the following disadvantage may occur. That is, when the display panel 20 is used in a portrait state as shown in FIGS. 7A and 7B and the like, moire tends to occur in three-dimensional display viewed by a viewer, due to a fact that pixels of R, G and B are arranged in an X direction in the display panel 20 as shown in FIG. 18.

To prevent this, in fourth to sixth examples described later, the electrodes on the first substrate 14 and the electrodes on the second substrate 17 are not perpendicularly formed, and are formed to intersect with each other at a predetermined angle.

Figure 20A:
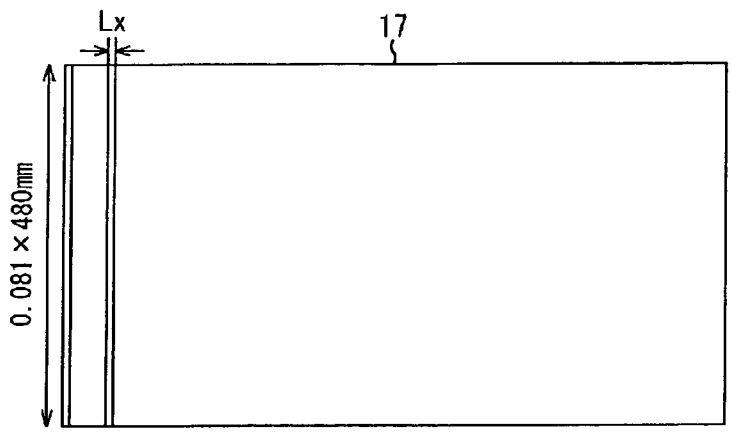
FIGS. 20A and 20B are diagrams, showing an angle of the first electrode group and an angle of the second electrode group, corresponding to fourth to sixth examples.
Figure 20B:
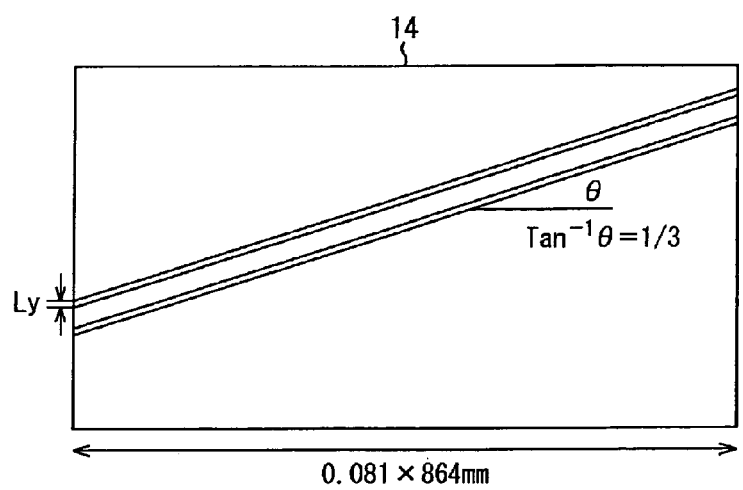

FIGS. 20A and 20B show electrode structures of a liquid-crystal lens array element 10 corresponding to the fourth to sixth examples described later, wherein FIG. 20A shows an electrode structure on a second substrate 17 side, and FIG. 20B shows an electrode structure on a first substrate 14 side. As shown in FIGS. 20A and 20B, electrodes on the first substrate 14 and electrodes on the second substrate 17 are formed to intersect with each other at an angle of (90−θ) in the fourth to sixth examples. Here, θ is $\tan^{-1}\theta = 1/3$.

FIG. 21 shows values of various design parameters corresponding to the first to sixth examples. N denotes the number of pixels with respect to a lens pitch p of the display panel 20, and electrode width Lx, Sx, Ly or Sy, an electrode gap a, and a substrate gap d are shown in a unit of µm as lengths of the relevant regions as indicated in FIG. 2.

The X-line generator 31 and the Y-line generator 32 supply power with a rectangular wave of 30 Hz or more while amplitude voltage of the rectangular wave is about 5 to 10 V, which is adjusted depending on the lens pitch p or the substrate gap d. Generally, the amplitude voltage needs to be set higher with increase in substrate gap d.

Next, evaluation of the first to sixth examples is described. Since a definite criterion for determining quality of three-dimensional display is not standardized at present, the following simple method is used here, and whether three-dimensional display may be recognized or not is assumed as a criterion.

Figure 22:
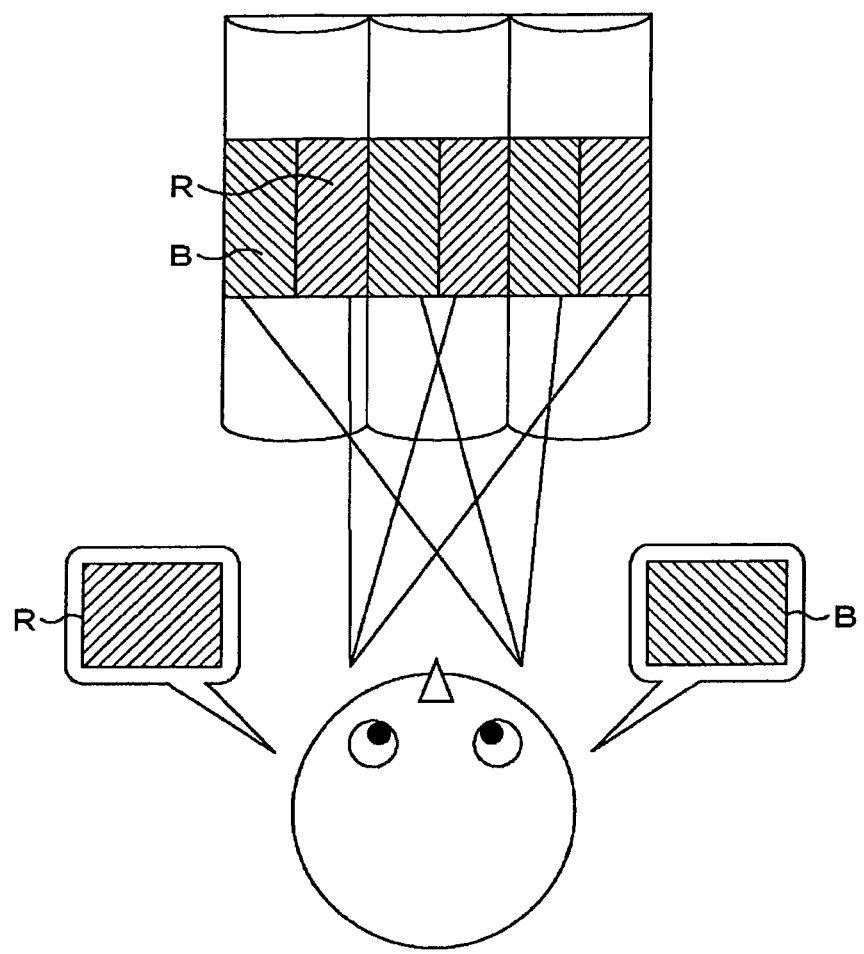
FIG. 22 is a diagram showing an evaluation method of three-dimensional display.

FIG. 22 shows a concept of evaluation of viewing quality of three-dimensional display in the first to sixth examples. As shown in FIG. 22, one blue pixel and one red pixel, or two pixels in total are provided in correspondence to one cylindrical lens formed by the liquid crystal lens array element 10. As shown in FIG. 22, a display pattern is outputted to the display panel 20 and displayed thereon such that blue and red are shown to right and left eyes respectively. Cameras are disposed at positions corresponding to the right and left eyes for photography, and whether blue and red are separately shown to right and left eyes is checked as a criterion. In a region of the two-dimensional display mode, red and blue are mixedly viewed as violet.

Drive amplitude voltage is gradually increased, and a voltage value immediately before a saturation region, in which even if the voltage is increased, visibility is substantially not changed, is assumed as drive voltage. Voltage amplitude V of a rectangular wave applied to each electrode is V=2Vx=2Vy. In addition, time (2D switching response time) for changing from the three-dimensional display mode to the two-dimensional display mode by applying 0 V is observed as an evaluation object.

The first to sixth examples are evaluated in the following seven kinds of use conditions. Evaluation results are as follows.

Use Condition 1 (The Whole Screen is in Two-Dimensional Display Mode)

In any of the first to sixth examples, the whole screen is violet as a result of visual evaluation, revealing approximately the same two-dimensional display as in the case that the liquid crystal lens array element 10 is not disposed on the display panel 20.

Use Condition 2 (Corresponding to FIGS. 6a and 6b, the Whole Screen is in Three-Dimensional Display Mode in Landscape State)

In any of the first to sixth examples, red may be observed at a left-eye position, and blue at a right-eye position. In other words, it may be confirmed that the three-dimensional display mode is achieved by the liquid crystal lens array element 10.

Use Condition 3 (Corresponding to FIGS. 7a and 7b, the Whole Screen is in Three-Dimensional Display Mode in Portrait State)

In any of the first to sixth examples, red may be observed at a left-eye position, and blue at a right-eye position. In other words, it may be confirmed that the three-dimensional display mode is achieved by the liquid crystal lens array element 10. However, in the first to third examples, a banded-pattern of red, blue and green, so-called moire, is observed, for example, in the case that the whole screen is displayed white, resulting in lack of visual comfortableness.

Use Condition 4 (Corresponding to FIGS. 8A and 8B or FIGS. 9A and 9B, Region of Three-Dimensional Display Mode and Region of Two-Dimensional Display Mode are Horizontally Separately Provided in Landscape State)

In any of the first to sixth examples, violet is observed in a region of the two-dimensional display mode regardless of a position of a boundary between the three-dimensional display mode and the two-dimensional display mode. In a region of the three-dimensional display mode, red may be observed at a left-eye position, and blue at a right-eye position. In other words, it may be confirmed that the three-dimensional display mode is achieved by the liquid crystal lens array element 10.

Use Condition 5 (Corresponding to FIGS. 10A and 10B or FIGS. 11A and 11B, Region of Three-Dimensional Display Mode And Region of Two-Dimensional Display Mode are Vertically Separately Provided in Landscape State)

In any of the first to sixth examples, violet is observed in a region of the two-dimensional display mode regardless of a position of a boundary between the three-dimensional display mode and the two-dimensional display mode. In a region of the three-dimensional display mode, red may be observed at a left-eye position, and blue at a right-eye position. In other words, it may be confirmed that the three-dimensional display mode is achieved by the liquid crystal lens array element 10.

Use Condition 6 (Corresponding to FIGS. 12A and 12B or FIGS. 13A and 13B, Region of Three-Dimensional Display Mode and Region of Two-Dimensional Display Mode are Vertically Separately Provided in Portrait State)

In any of the first to sixth examples, violet is observed in a region of the two-dimensional display mode regardless of a position of a boundary between the three-dimensional display mode and the two-dimensional display mode. In a region of the three-dimensional display mode, red may be observed at a left-eye position, and blue at a right-eye position. In other words, it may be confirmed that the three-dimensional display mode is achieved by the liquid crystal lens array element 10. However, in the first to third examples, a banded-pattern of red, blue and green, so-called moire, is observed, for example, in the case that the whole screen is displayed white, resulting in lack of visual comfortableness.

Use Condition 7 (Corresponding to FIGS. 14A and 14B or FIGS. 15A and 15B, Region of Three-Dimensional Display Mode and Region of Two-Dimensional Display Mode are Horizontally Separately Provided in Portrait State)

In any of the first to sixth examples, violet is observed in a region of the two-dimensional display mode regardless of a position of a boundary between the three-dimensional display mode and the two-dimensional display mode. In a region of the three-dimensional display mode, red may be observed at a left-eye position, and blue at a right-eye position. In other words, it may be confirmed that the three-dimensional display mode is achieved by the liquid crystal lens array element 10. However, in the first to third examples, a banded-pattern of red, blue and green, so-called moire, is observed, for example, in the case that the whole screen is displayed white, resulting in lack of visual comfortableness.

FIG. 23 collectively shows the evaluation in the use conditions 1 to 7. In FIG. 23, evaluations of two-dimensional display and three-dimensional display are shown in four levels, very good, good, fairly good, and bad. "Very good" shows that an image is observed with red and blue being separated. "Fairly good" shows that an image is observed with red and blue being nearly separated. "Good" shows intermediate viewing quality between "very good" and "fairly good".

As described hereinbefore, according to the embodiment, three-dimensional display is enabled regardless of an orientation of a longitudinal direction of a screen, namely, regardless of whether the smartphone is used in a portrait state or a landscape state, and besides, a region of a two-dimensional display mode and a region of a three-dimensional display mode may be provided at a time on a screen with an optional position as a boundary.

Other Embodiments

Figure 24A:
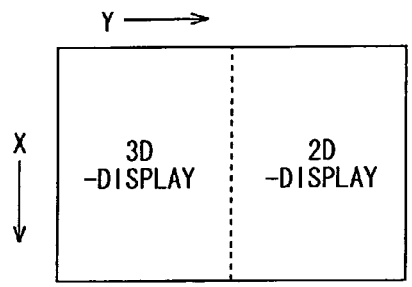
FIGS. 24A and 24B are diagrams showing another configuration example of the liquid crystal lens array element.
Figure 24B:
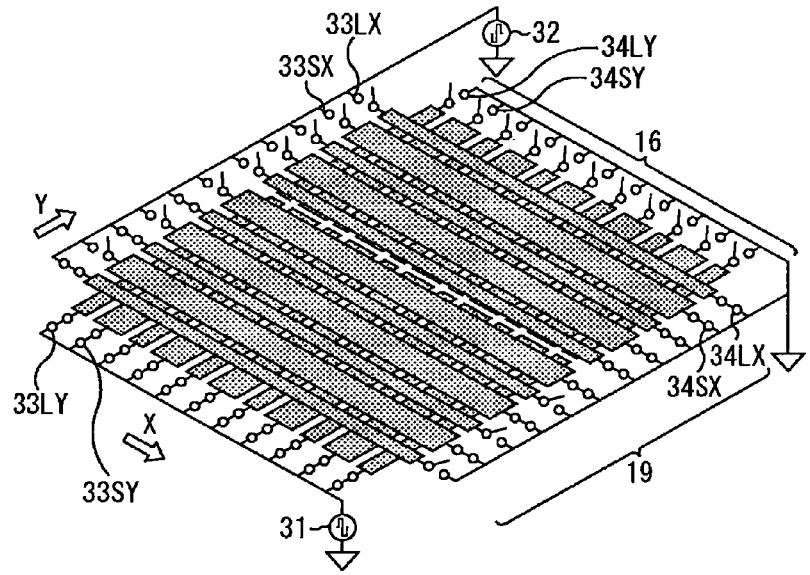

When a region of a two-dimensional display mode and a region of a three-dimensional display mode is not provided on a screen with an optional position as a boundary, and a boundary is fixed at a position, at which the smartphone is expected to be used most conveniently, electrodes of the first electrode group 16 on the first substrate 14 may be divided at a portion as the boundary, for example, as shown in FIGS. 24A and 24B. Even according to such a configuration, the same advantages as in the embodiment may be obtained except that the boundary is optionally set.

An embodiment of the invention is not limited to the above embodiment, and may be variously modified or altered within a scope without departing from the gist of the invention.

The present application contains subject matter related to that disclosed in Japanese Priority Patent Application JP 2010-015739 filed in the Japan Patent Office on Jan. 27, 2010, and Japanese Priority Patent Application JP 2010-149206 filed in the Japan Patent Office on Jun. 30, 2010, the entire content of which is hereby incorporated by references.

It should be understood by those skilled in the art that various modifications, combinations, sub-combinations and alterations may occur depending on design requirements and other factors insofar as they are within the scope of the appended claims or the equivalent thereof.

What is claimed is:

1. A stereoscopic display device comprising:
   a display panel performing image display; and
   a lens array element including a first electrode, a second electrode opposed to the first electrode, and a liquid crystal layer disposed between the first electrode and the second electrode, the lens array element being configured in such a manner that a lens effect on display image light from the display panel is controlled depending on a voltage applied to the first electrode and a voltage applied to the second electrode,
   wherein one of the first electrode and the second electrode is structured to allow an electric field to be applied to the liquid crystal layer for each of a plurality of predetermined sub-regions, individually, and
   wherein the plurality of predetermined sub-regions are the same in size.

2. The stereoscopic display device according to claim 1, wherein
   part of the plurality of predetermined sub-regions in the lens array element are set into a state in which the lens effect is active so that the display image light from the display panel is refracted to allow stereoscopic vision, thereby to achieve three-dimensional display in the part of the sub-regions, and the remainder of the plurality of predetermined sub-regions in the lens array element are set into a state in which the lens effect is inactive so that the display image light from the display panel passes through the remainder of the sub-regions without refraction, thereby to achieve two-dimensional display in the remainder of the sub-regions.

3. The stereoscopic display device according to claim 2, wherein the first electrode as a whole is a planar electrode, the second electrode includes a plurality of line electrodes arranged to extend in a vertical direction with gaps between the line electrodes, the second electrode being configured to have a predetermined common voltage applied to the line electrodes, and the planar electrode is configured of a plurality of divided electrodes corresponding to the plurality of predetermined sub-regions, respectively.

4. The stereoscopic display device according to claim 2, wherein the first electrode is a planar common electrode to a whole of which a predetermined common voltage is applied, the second electrode includes a plurality of line electrodes which are arranged to extend in a vertical direction with gaps between the line electrodes, and the plurality of line electrodes are divided into a plurality of electrode groups corresponding to the plurality of predetermined sub-regions, respectively, the electrode groups being electrically separated from one another.

5. The stereoscopic display device according to claim 2, wherein the lens array element, in a region where the lens effect is active, exhibits a lens effect which is substantially equivalent to a lens effect of a plurality of cylindrical lenses arranged in parallel in a horizontal direction.

6. A stereoscopic display device comprising:

a display panel performing image display; and a lens array element including a first electrode, a second electrode opposed to the first electrode, and a liquid crystal layer disposed between the first electrode and the second electrode, the lens array element being configured in such a manner that a lens effect on display image light from the display panel is controlled depending on a voltage applied to the first electrode and a voltage applied to the second electrode, wherein one of the first electrode and the second electrode is structured to allow an electric field to be applied to the liquid crystal layer for each of a plurality of predetermined sub-regions, individually, a first sub-region and one or more second sub-regions are provided as the plurality of predetermined sub-regions, and the first sub-region is allocated as the part of the plurality of predetermined sub-regions for three-dimensional display, and the second sub-regions are allocated as the remainder of the plurality of predetermined sub-regions for two-dimensional display.

7. The stereoscopic display device according to claim 6, wherein part of the plurality of predetermined sub-regions in the lens array element are set into a state in which the lens effect is active so that the display image light from the display panel is refracted to allow stereoscopic vision, thereby to achieve three-dimensional display in the part of the sub-regions, and the remainder of the plurality of predetermined sub-regions in the lens array element are set into a state in which the lens effect is inactive so that the display image light from the display panel passes through the remainder of the sub-regions without refraction, thereby to achieve two-dimensional display in the remainder of the sub-regions.

8. A stereoscopic display device comprising:

a display panel performing image display; and a lens array element including a first electrode, a second electrode opposed to the first electrode, and a liquid crystal layer disposed between the first electrode and the second electrode, the lens array element being configured in such a manner that a lens effect on display image light from the display panel is controlled depending on a voltage applied to the first electrode and a voltage applied to the second electrode, wherein one of the first electrode and the second electrode is divided into a plurality of predetermined sub-regions which are electrically separated from one another, and wherein the plurality of predetermined sub-regions are the same in size.

9. The stereoscopic display device according to claim 8, wherein the first electrode as a whole is a planar electrode, the second electrode includes a plurality of line electrodes arranged to extend in a vertical direction with gaps between the line electrodes, the second electrode being configured to have a predetermined common voltage applied to the line electrodes, and the planar electrode is configured of a plurality of divided electrodes corresponding to the plurality of predetermined sub-regions, respectively.

10. The stereoscopic display device according to claim 8, wherein the first electrode is a planar common electrode to a whole of which a predetermined common voltage is applied, the second electrode includes a plurality of line electrodes which are arranged to extend in a vertical direction with gaps between the line electrodes, and the plurality of line electrodes are divided into a plurality of electrode groups corresponding to the plurality of predetermined sub-regions, respectively, the electrode groups being electrically separated from one another.

11. The stereoscopic display device according to claim 8, wherein part of the plurality of predetermined sub-regions in the lens array element are set into a state in which the lens effect is active so that the display image light from the display panel is refracted to allow stereoscopic vision, thereby to achieve three-dimensional display in the part of the sub-regions, and the remainder of the plurality of predetermined sub-regions in the lens array element are set into a state in which the lens effect is inactive so that the display image light from the display panel passes through the remainder of the sub-regions without refraction, thereby to achieve two-dimensional display in the remainder of the sub-regions.

* * * * *